United States Patent
Wilson et al.

(10) Patent No.: US 11,789,718 B2
(45) Date of Patent: Oct. 17, 2023

(54) SYSTEM AND METHOD FOR SUBSCRIPTION BASED SOLUTION MODIFICATION IMPLEMENTATION

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 17/570,645

(22) Filed: Jan. 7, 2022

(65) Prior Publication Data

US 2023/0222470 A1   Jul. 13, 2023

(51) Int. Cl.
*G06F 8/65* (2018.01)

(52) U.S. Cl.
CPC ...................................... *G06F 8/65* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 6,317,815 B1 | 11/2001 | Mayer et al. | |
| 9,178,948 B2 | 11/2015 | Chen et al. | |
| 9,430,858 B1 | 8/2016 | Har et al. | |
| 9,705,995 B2 | 7/2017 | Edlund et al. | |
| 2008/0256641 A1 | 10/2008 | Lo | |
| 2012/0005649 A1 | 1/2012 | Lavin | |
| 2012/0311673 A1 | 12/2012 | Sodah | |
| 2013/0339306 A1 | 12/2013 | Kim et al. | |
| 2015/0005033 A1* | 1/2015 | Petersson | H04W 8/183 455/558 |

(Continued)

OTHER PUBLICATIONS

Souvik Chakravarty (2019). Arm System Control Processor (SCP) Firmware-101. Linaro. https://static.linaro.org/connect/san19/presentations/san19-117.pdf.

(Continued)

*Primary Examiner* — Jae U Jeon
(74) *Attorney, Agent, or Firm* — Womble Bond Dickinson (US) LLP

(57) ABSTRACT

Methods, systems, and devices for providing for providing computer implemented services using managed systems are disclosed. To improve the likelihood of the computer implemented services being provided, a subscription based model may be used to manage the managed systems. The subscription based model may provide for automatic configuration of and software deployment to any number of managed systems to provide subscribed to solutions to various users. Over time, the solutions desired by users may change. The subscription based model may facilitate automatic disablement of existing solutions and deployment of new solutions to facilitate changes in solutions. To provide for continuity of solutions, the automated disablement and enablement processes may take into account data compatibility, and may proactively reformat or otherwise modify data to reduce data incompatibility. A continuous experience may be provided through which previously utilized data may be retained and used after solution changes have been implemented.

20 Claims, 15 Drawing Sheets

(56) References Cited

U.S. PATENT DOCUMENTS

| | | | | |
|---|---|---|---|---|
| 2015/0373012 A1* | 12/2015 | Bartz | .................... | G06F 9/5072 |
| | | | | 715/738 |
| 2016/0150396 A1 | 5/2016 | Milhizer | | |
| 2017/0006119 A1* | 1/2017 | Pogrebinsky | ......... | G06F 3/0482 |
| 2017/0090912 A1 | 3/2017 | Fuglsang et al. | | |
| 2017/0244783 A1* | 8/2017 | Maresca | ............... | H04L 67/104 |
| 2017/0359356 A1 | 12/2017 | Brandwine | | |
| 2021/0067406 A1 | 3/2021 | Myers et al. | | |
| 2021/0160255 A1 | 5/2021 | Cherkas et al. | | |
| 2021/0360074 A1 | 11/2021 | Long | | |
| 2023/0171586 A1* | 6/2023 | Holmes | ................. | H04W 8/186 |
| | | | | 455/435.1 |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

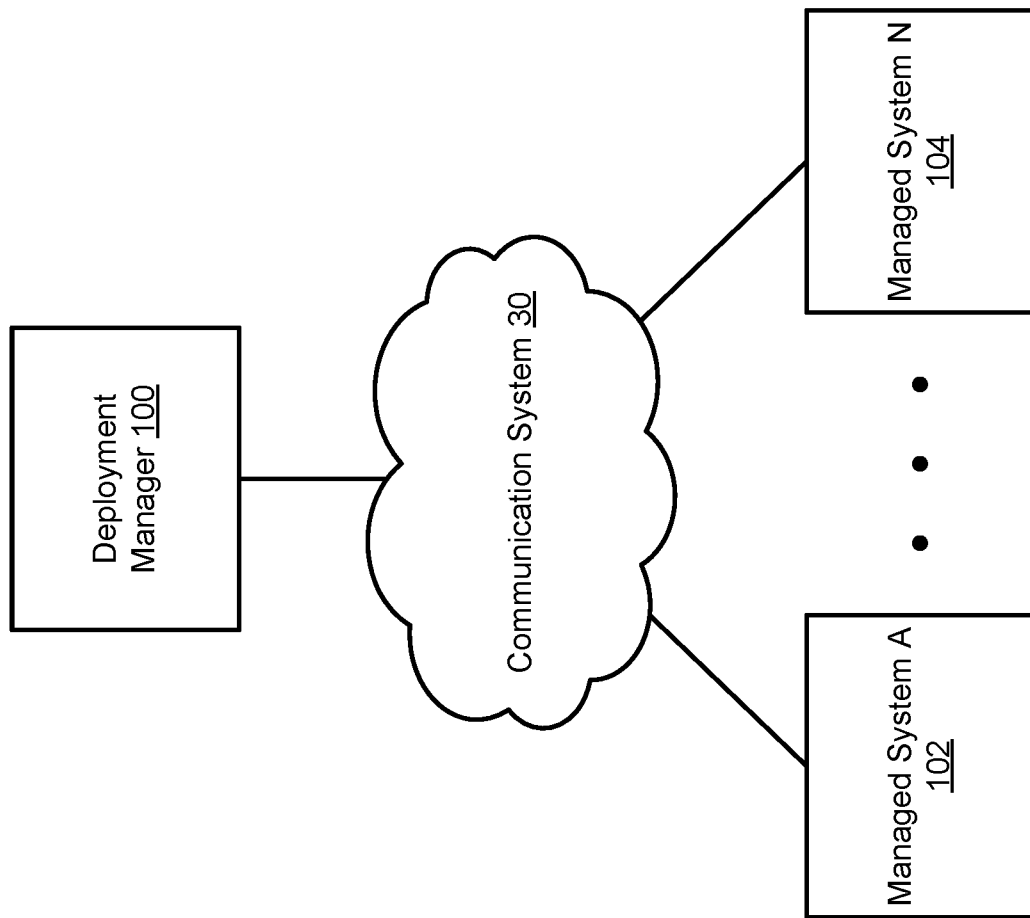

SYSTEM AND METHOD FOR SUBSCRIPTION BASED SOLUTION MODIFICATION IMPLEMENTATION

FIELD DISCLOSED HEREIN

Embodiments disclosed herein relate generally to system management. More particularly, embodiments disclosed herein relate to systems and methods to modify deployed solutions based on subscription changes.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIG. 1B shows a block diagram illustrating a deployment in accordance with an embodiment.

DETAILED DESCRIPTION

Figure 1A:
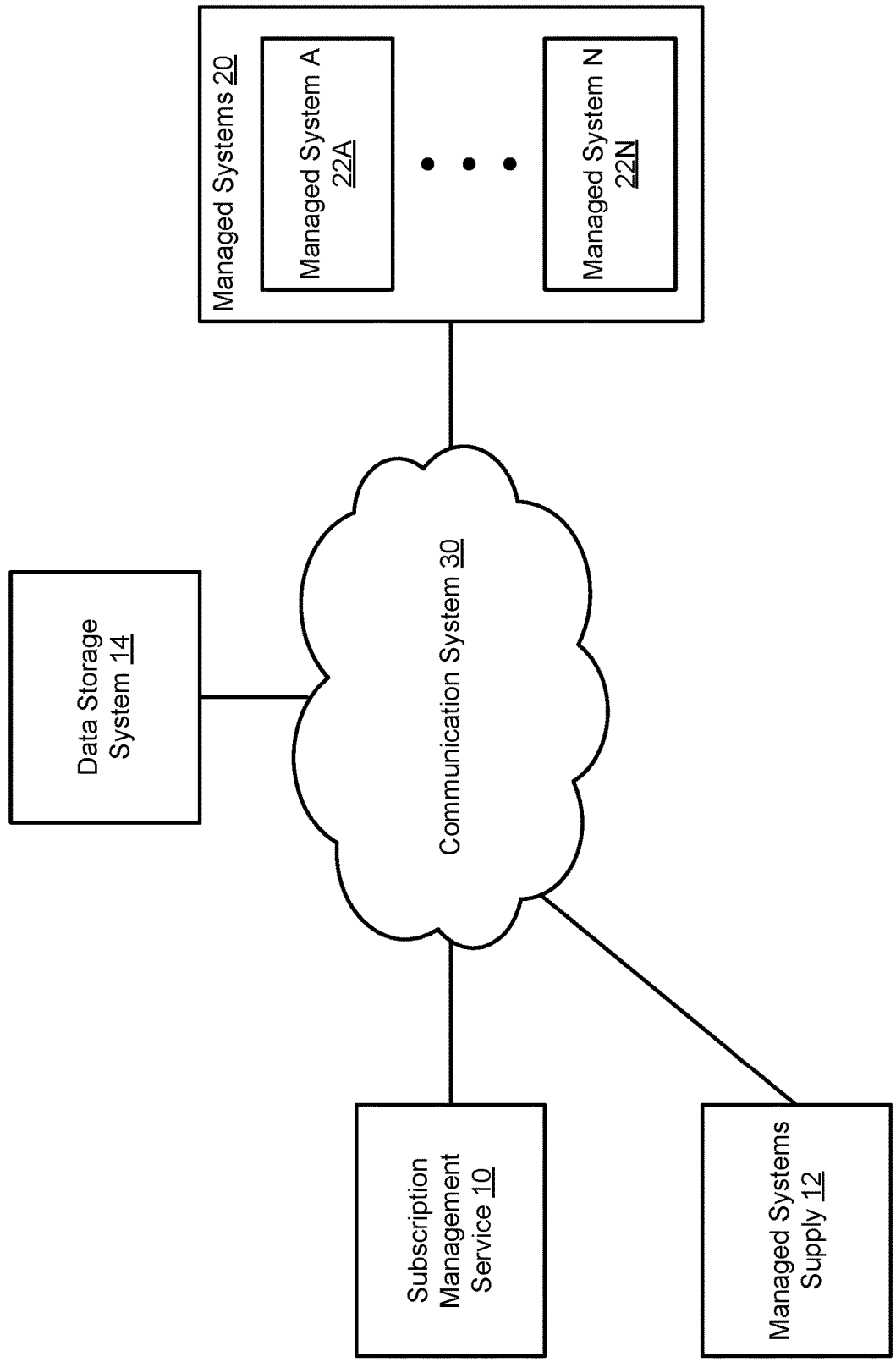
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology. Additionally, references to "a message" or "messages" should be understood to indicate that any number of messages may be used to transmit information. A message may correspond to any type of data unit implemented by one or more communication protocols.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs. An aggregation of different types of computer implemented services may need to be provided so that corresponding solutions may be provided.

To facilitate use of solutions, embodiments disclosed herein may utilize a subscription based model for managing various managed systems that may provide all, or a portion, of the solutions. The subscription based model may provide for automatic configuration of and software deployment to any number of managed systems to provide subscribed to solutions to various users.

Over time, the solutions desired by users may change. The subscription based model may facilitate automatic disablement of existing solutions and deployment of new solutions to facilitate changes in solutions. To provide for continuity of solutions, the automated disablement and enablement processes may take into account data compatibility, and may proactively reformat or otherwise modify data to reduce data incompatibility. Consequently, users of the solutions may be provided with a continuous experience through which previously utilized data may be retained and used after solution changes have been implemented.

In an embodiment, a computer-implemented method for providing a solution using managed systems is provided. The method may include obtaining, by a local subscription manager hosted by a managed system of the managed systems, a subscription update for the managed system, the subscription update indicating disablement of one or more existing subscriptions and enablement of one or more new subscriptions for the managed system; based on the subscription update: performing, by the local subscription manager, one or more disablement actions associated with the one or more existing subscriptions; and performing, by the local subscription manager, one or more subscription enablement actions based on the one or more new subscriptions, the performance of the one or more subscription enablement actions modifying operation of at least one of: a startup manager of the managed system, an operation manager of the managed system, and a software stack of the managed system; locally registering, by the local subscription manager, the one or more existing subscriptions as being disabled and the one or more new subscriptions as being enabled; remotely registering, by the local subscription manager, the one or more new subscriptions with a subscription management service that initiated the subscription update; and enforcing, by the local subscription manager, the locally registered as enabled one or more new subscriptions on the managed system without enforcing the locally registered as disabled one or more existing subscriptions.

Performing the one or more disablement actions may include identifying a code block associated with the one or more existing subscriptions, the code block being locally stored in storage resources of the local subscription manager; and initiating execution of the identified code block by a processor of computing resources of the managed system, the storage resources of the local subscription manager being distinct from the computing resources and inaccessible by the managed system.

The computer-implemented method may also include, after execution of the identified code block, sending a disablement acknowledgement to the subscription management service, the disablement acknowledgement indicating that a previous solution implemented with the managed system is no longer accessible by a user of the managed system.

Performing the one or more subscription enablement actions may include identifying a code block associated with the one or more new subscriptions, the code block being locally stored in storage resources of the local subscription manager; and initiating execution of the identified code block by a processor of computing resources of the managed system, the storage resources of the local subscription manager being distinct from the computing resources and inaccessible by the managed system.

The computer-implemented method may also include prior to initiating execution of the identified code block, notifying the subscription management service that the one or more new subscriptions are being implemented with the managed system.

Locally registering the one or more existing subscriptions as being disabled may include removing one or more entries from a subscription information repository stored in storage resources of the local subscription manager, with presence of the one or more entries in the subscription information repository indicating a live status of the one or more existing subscriptions, and the one or more entries comprise the one or more subscription disablement actions and/or access information for the one or more subscription disablement actions.

Locally registering the one or more new subscriptions as being enabled may include adding one or more new entries to the subscription information repository, each of the one or more new entries being associated with one of the one or more new subscriptions, each of the one or more new entries comprising one or more other disablement actions and/or access information for the one or more other disablement actions, the one or more other disablement actions usable to disable a corresponding one of the one or more new subscriptions.

The operation of the operation manager may be updated updated: prior to updating of the operation of the software stack, and after updating of the operation of the startup manager. The managed system may be rebooted after the updating of the operation manager and prior to the updating of the software stack.

The local subscription manager may include a computing device that is hosted by the managed system, and the computing device may operate independently from the managed system.

The computing device may be adapted to obtain the subscription update via an out of band management interface to the subscription management service and/or a deployment manager that manages the managed systems on behalf of the subscription management service.

Enforcing the locally registered as enabled one or more new subscriptions on the managed system without enforcing the locally registered as disabled one or more existing subscriptions may include making a determination that the locally registered as enabled one or more new subscriptions has expired; and based on the determination: identifying a code block associated with the locally registered as enabled one or more new subscriptions, the code block being locally stored in storage resources of the local subscription manager; and initiating execution of the identified code block by a processor of computing resources of the managed system, the storage resources of the local subscription manager being distinct from the computing resources and inaccessible by the managed system.

In an embodiment, a non-transitory media is provided that may include instructions that when executed by a processor cause the computer-implemented method to be performed.

In an embodiment, a managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices (e.g., data processing systems) that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components of one or more managed systems may give rise to an integrated solution, platform, service, etc. able to provide desired computer implemented services. Changes in the hardware and/or software components of managed system may provide for various types of different computer implemented services and corresponding solutions to be provided over time.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1C:
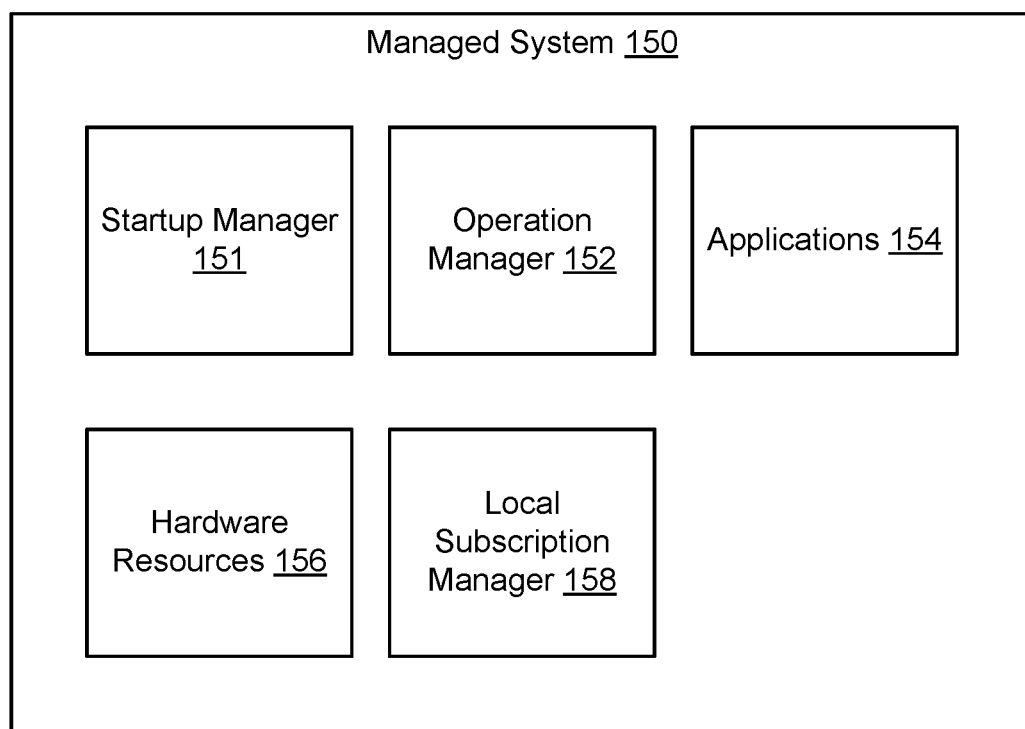
FIG. 1C shows a block diagram illustrating a managed system in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components, software components, and/or applications may need to be implemented by managed systems 20 depending on the computer implemented services desired to be provided by the respective managed systems. Refer to FIG. 1C for additional details regarding managed systems 20.

Additionally, any number of the managed system may operate (e.g., as part of a deployment) to provide various computer implemented services independently or cooperatively with other such managed systems. In such scenarios, the operation of a group of managed system may be managed by a local control plane for those managed systems. Refer to FIG. 1B for additional details regarding groups of managed systems.

However, to provide desired computer implemented services, corresponding configurations of hardware and/or software components (e.g., applications) necessary for corresponding computer implemented services to be provided by the managed systems may need to be identified, which may be technically challenging. For example, a person may need to be familiar with a range of hardware and software component issues to effectively select the hardware components and/or software components of a system so that the system is capable of providing the desired computer implemented services. Additional complexities may arise when multiple such systems may need to operate cooperatively to provide the computer implemented services. Further, if a system is procured that lacks necessary hardware and/or software components, the procured system may not be able to provide its desired functions.

In additional to challenges in identifying initial configuration, it may also be challenging to ascertain the changes to one or more managed systems (e.g., that provide an existing solution) necessary to provide a different solution. For example, any number of managed systems may provide any number of solutions. It may be challenging to identify the differences between the functionality that the managed systems currently provide and the functionality necessary for other solutions to be provided.

In general, embodiments disclosed herein relate to system, devices and methods for managing one or more managed systems in a manner that may improve the likelihood of the managed system being able to provide desired computer implemented services over time. To do so, a system in accordance with embodiments may manage the provisioning of solution level functionality by automating the dynamic process of deploying, configuring, and managing the operation of any number of managed systems. To facilitate automated provisioning of solution level functionality using managed systems, a management service may be provided. Rather than requiring a person to select the type, quantity, software components, and/or other features of managed systems, the management service may allow a user to focus on the desired functionality (e.g., a particular solution) which is to be provided. The management service may automatically translate the desired functionality into a workable deployment configuration of any number of managed systems. The management service may, after the managed systems are deployed, automatically reconfigure the managed systems, deploy software components to, and/or otherwise manage the operation of the managed systems to provide the desired functionality to the user.

By doing so, embodiments disclosed herein may (i) reduce the cognitive burden for selecting and managing systems to provide computer implemented services for desired solutions over time, (ii) may improve the quality of computer implemented services by ensuring that only solutions supported by the deployment managed systems are attempted to be implemented with the managed systems, and/or (iii) automatically limit the use of the desired solutions in a manner consistent with that expected by users to manage cost associated with use of the desired solution.

To provide the above noted functionality, a system in accordance with an embodiment may include subscription management service 10. Subscription management service 10 may facilitate (i) selection and procurement of managed systems to a client site (e.g., a deployment location), and (ii) automatic configuration of managed systems 20 to provide solutions over time. To do so, subscription management service 10 may (i) obtain information indicating desired functions of one or more of managed systems 20, (ii) select and deploy one or more managed systems 20 to a client site (e.g., which may be stored in managed systems supply 12 prior to deployment), (iii) automatically deploy software components to managed systems 20 using a subscription model, (iv) when changes in desired functionality occur, automatically reconfigure, remove software components, and deploy new software components to the managed systems to modify their operation to provide the desired functionality, (v) log changes in subscriptions both locally with the managed system and with the subscription management service, and (vi) manage the use of the deployed managed systems using the subscription model in accordance with the logged subscriptions.

To deploy a solution, a known topology of management entities and/or a software stack may be instantiated on the managed systems. Additionally, if already used for an existing solution that is being modified, any number of software entities hosted by the managed systems may be removed or modified, and various configurations for the managed systems may be modified. Once the software stack is instantiated or modified if already existing from providing of other solutions, a subscription corresponding to a solution provided by the instantiated entities/software/reconfiguration may be both locally recorded with the managed systems and remotely recorded with the management service.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made on the basis that the requesting entity may be likely to request additional features and/or capabilities in the future. Consequently, managed systems 20, when deployed to a client site, may include sufficient hardware components to address a range of different use cases and solution, beyond those that may be immediately apparent to a requesting entity. The additional capabilities (e.g., various hardware resources) may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20).

Subscription management service 10 may also allow a provider of managed systems 20 to selectively manage various functionalities (e.g., parts of solutions) provided by managed systems 20. For example, the service may allow for different solutions to be provided by managed systems 20 over time through performance of disablement actions and enablement actions. By doing so, a provider of managed systems 20 may tailor the solutions provided by managed systems 20 (e.g., from all possible solutions) to only those requested, desired, and/or procured by an operator, manager, and/or user of managed systems 20, and automatically adjust to changes to requested solutions over time. Doing so may allow for cost controls for various solutions to be put in place by a user of a managed system.

For example, consider a scenario where a provider of a managed system does so on a contractual basis where a user of the managed system agrees to purchase subscriptions for various solutions. The user may use subscription management service 10 to select to which of the aforementioned solutions the user wishes to have enabled, to the extent of such enablement, durations of enablement, etc. After an initial selection leading to deployment of managed systems 20, the user may modify their subscription to allow for other solutions to be provided by managed systems 20. In response, subscription management service 10 may cooperate with local subscription managers hosted by managed systems 20 to reconfigure the operation of managed systems 20 to allow these additional (or reduced numbers of) features to be utilized by the users. This process may be seamless to the users of the solutions and the resulting solutions may be presented to the users via the subscription management service. Consequently, the users may not need to interact with the managed systems as the solutions are modified to meet their requirements over time.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client/user devices not illustrated in FIG. 1A but may be operably connected to subscription management service 10 via communication system 30 or directly using managed systems 20). When an election is made, subscription management service 10 may record the election and send information regarding the elected subscriptions or changes in subscriptions to local subscription managers hosted by managed systems 20. Once sent, the local subscription managers may modify the operation of managed systems 20 such that the operation of managed systems 20 matches the elections received and/or recorded by subscription management service 10.

To facilitate solution selection, the graphical user interfaces presented to the users may present solutions that are compatible with managed systems 20. Accordingly, the persons tasked with managed systems may not need to be aware of the current configuration of managed systems 20, the capabilities, or limitations of managed systems 20 to identify which solutions the managed systems may provide.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information). Consequently, user access to solutions provided by managed systems may be automatically revoked by the managed systems thereby facilitating distributed management of the managed systems that does not rely on or require communication with other entities.

In an embodiment, the code blocks include executable computer code that may be executed by a processor of a managed system. The local subscription manager may push or otherwise cause various code blocks to be executed by processors of host managed systems. The code blocks may cause the managed systems to perform any number of enablement and/or disablement actions. The actions may include, for example, (i) enabling/disabling hardware components, (ii) enabling/disabling software components, and/or (iii) modifying configurations of hardware and/or software components. The code blocks may cause other actions to be performed without departing from embodiments disclosed herein. In an embodiment, some of the enablement and/or disablement actions are performed by the local subscription managers hosted by managed systems.

Some of the enablement and/or disablement actions may cause managed systems to store data in and/or retrieve data from data storage system 14. Data storage system 14 may store any type and quantity of data. The stored data may include, for example, copies of management data for various entities, copies of solution data from various managed systems, and/or other types of data.

For example, in cases of changes in subscription, some solution data may no longer be compatible with the operation of a managed system after the change in subscription is implemented (e.g., which may remove and add new software components, which may not be compatible with the format of the data). The disablement and/or enablement actions may cause a managed system undergoing a change in subscription to export data, information, configuration settings, and/or other types of information which may be necessary to provide continuity of a services after the change in subscription. The aforementioned data may be exported by, for example, invoking the functionality of a solution stack (e.g., software components) which may include native export functionality, manually copying data structures, and/or performing other actions. The exported data may be stored in locations (e.g., local and/or remote in, for example, data storage system 14) that will not be impacted by the changes in subscription. After a subscription is implemented with various software components, one or more enablement actions may cause the exported data to be imported or to otherwise become used by the post-subscription change managed system. By doing so, data that may be relevant to users may be retained through subscriptions changes thereby improving the utility of post-subscription change services provided by managed systems.

In addition to data storage functionality, data storage system 14 may include data conversion functionality. As various managed systems are modified over time, they may lose compatibility with various portions of solution data (e.g., desired results, configuration settings, or other types of data that may be important to users). The data conversion functionality may also incompatible data to be converted to compatible data. For example, the data conversion functionality may modify data layouts, arrangements, or other features that may be required for data to be compatible (e.g., readable, accessible, modifiable, etc.) with various components that may be deployed to managed systems 20 over time.

In some embodiments, data storage system 14 is implemented with a public or private cloud.

Any of subscription management service 10, managed systems supply 12, data storage system 14, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

In an embodiment, one or more of subscription management service 10, managed systems supply 12, data storage system 14, and managed systems 20 are operably connected via communication system 30. Communication system 30 may allow any of subscription management service 10, managed systems supply 12, data storage system 14, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 6), a public network, and/or may include the Internet. For example, managed systems 20 may be operably connected to subscription management service 10 via the Internet. Subscription management service 10, managed systems supply 12, data storage system 14, managed systems 20, and/or communication system 30 may be adapted to perform one or more protocols for communicating via communication system 30.

While illustrated in FIG. 1A with a limited number of specific components, a system may include additional, fewer, and/or different components without departing from embodiments disclosed herein.

Turning to FIG. 1B, a block diagram illustrating a deployment including managed systems 102, 104 in accordance with an embodiment is shown. Like named components in FIGS. 1A-1B may be similar.

The deployment may provide any number and type of computer implemented services. The deployment may be located, for example, at a user selected site, a data center, or another location. The deployment may provide various solutions to users of, for example, an organization on a contractual basis. For example, the organization may agree to pay fees for the solutions provided by the deployment (and the provider of the solutions may be responsible for managing operation of managed systems that provide the solutions). The solutions may include any number and type of computer implemented services provided by any number of managed systems 102, 104.

The deployment may include deployment manager 100. Deployment manager 100 may locally manage any number of managed systems 102, 104. For example, the subscription management service 10 may obtain information regarding desired solutions and provide information usable to provide the solutions to deployment manager 100, which may in turn manage managed systems 102, 104 based on the information.

To facilitate management, deployment manager 100 may (i) host (or may retrieve/facilitate retrieval of) various software images to facilitate deployment of software necessary for various solutions for managed systems 102, 104 to be implemented, (ii) manage communications such as acknowledgements between subscription management service 10 and managed systems 102, 104 during implementation of solutions and removal of existing solutions, and/or (iii) provide other management functionalities. Thus, deployment manager 100 may function as a control plane for any number of managed systems 102, 104, which may be managed via software deployment to cooperatively provide one or more solutions.

Deployment manager 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

Turning to FIG. 1C, a block diagram illustrating managed system 150 in accordance with an embodiment is shown. Managed system 150 may be similar to any of managed systems 20 shown in FIGS. 1A-1B. Managed system 150 may provide desired computer implemented service by allowing for its automatic reconfiguration over time based on subscriptions maintained by subscription management service 10, shown in FIG. 1A. When reconfigured, managed system 150 may provide (in isolation and/or cooperation with other managed systems) a solution by virtue of its operation in the reconfigured state.

To provide the solutions, a combination of management entities and a software stack may need to be deployed to a host managed system. Additionally, various configurations for the managed system may need to be set. Different solutions may be provided with similar or different combinations of management entities, software stacks, and various configurations.

Figure 6:
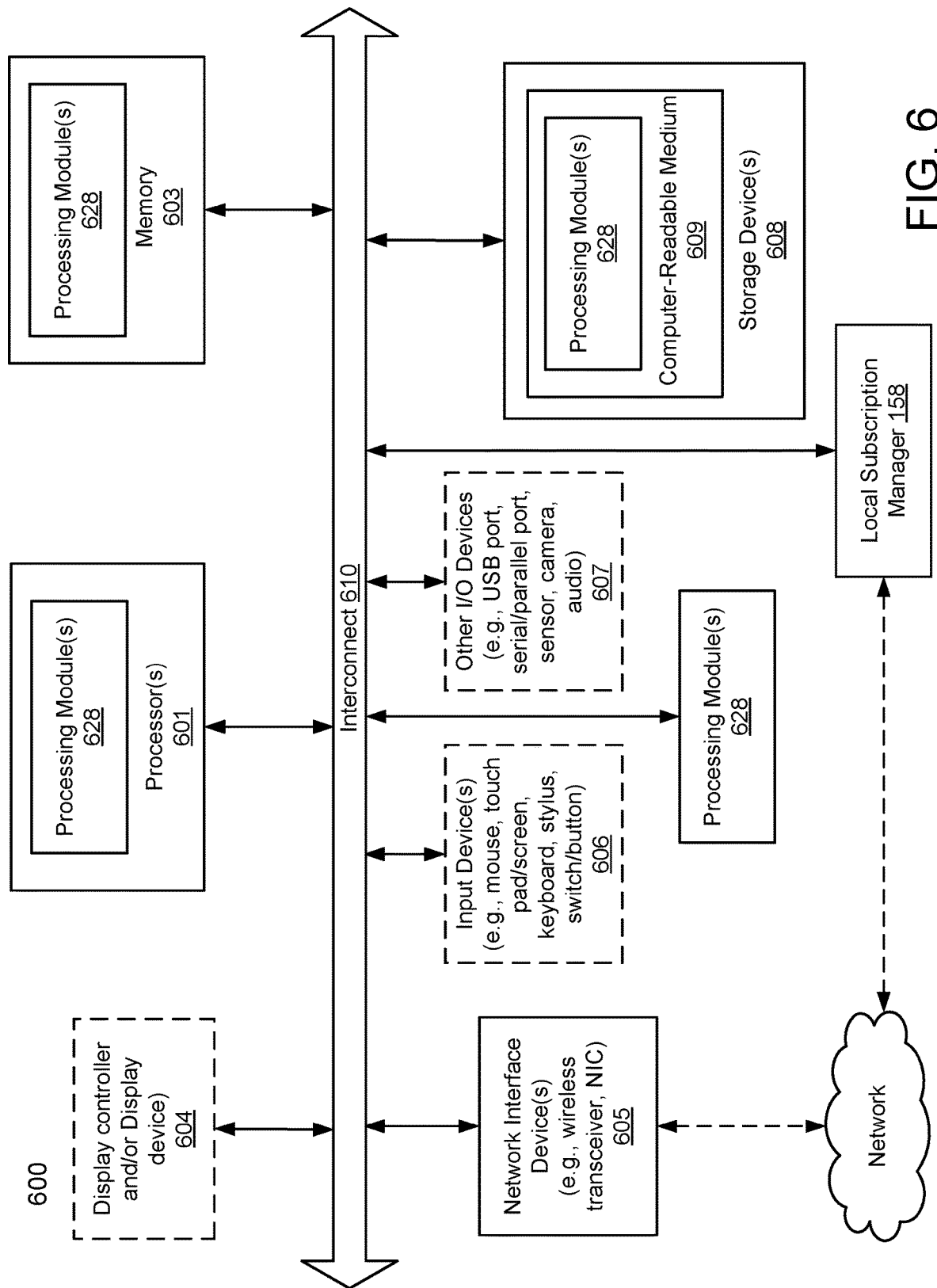
FIG. 6 shows a block diagram illustrating a computing device in accordance with an embodiment.

In addition (and/or alternatively) to any of the components shown in FIG. 6, managed system 150 may include startup manager 151, operation manager 152, applications 154, hardware resources 156, and local subscription manager 158. Each of these components is discussed below.

Startup manager 151 may manage placing managed system 150 in an operating state conducive to operation of applications 154 (e.g., which may include one or more software stacks). For example, after managed system 150 is power cycled, managed system 150 may not be in an operating state in which (all or a portion of) applications 154 may operate. To enter the operating state, startup manager 151 may perform any number processes such as (i) a power on self-test, (ii) displaying various portions of information regarding the function of a host managed system, (iii) performing an inventory of hardware resources 156, and (iv) beginning execution of and/or handing off operation management of managed system 150 to operation manager 152 (e.g., the actions in aggregate being a "startup"). Startup manager 151 may be implemented with, for example, a basic input output system (BIOS) or other type of startup management entity.

In an embodiment, startup manager 151 includes one or more configurations which may modify the manner in which it performs the startup. For example, the configurations may allow various actions to be added to, removed from, and/or modified in the startup.

In an embodiment, startup manager 151 also includes functionality to cause information regarding the function of a host managed system to be presented. For example, startup manager 151 may include functionality to generate and display graphical user interfaces which may indicate, to users, a function of the host managed system. Different types of graphical user interfaces may be displayed depending on how a "personality" of a host managed system is set thereby allowing users to be appraised regarding the expected functionality of the host managed system.

Operation manager 152 may generally manage operation of the components of managed system 150 after completion of startups by startup manager 151, except for local subscription manager 158. For example, operation manager 152 may be implemented with an operating system (and/or other management entities such as drivers, translation tables, etc.) used to manage hardware resources 156 of managed system 150 to facilitate execution of applications 154.

To facilitate provisioning of a solution with managed system 150, local subscription manager 158 may facilitate automatic deployment of software components, settings, and/or other features to managed system 150. The deployed software components may include all, or a portion, of startup manager 151, operation manager 152, and applications 154. Likewise, local subscription manager 158 may facilitate automatic removal of software components. Further, local subscription manager 158 may also facilitate disabling and/or enabling various hardware components (e.g., of hardware resources 156). Doing so may provide for selective limitations of various functionalities of managed system 150. For example, when a hardware component is disabled, startup manager 151 may treat it as not being present thereby causing operation manager 152 and applications 154 to operate as though it is not present as well thereby allowing for selective restriction of use of hardware resources 156.

To ensure that only software components compatible with hardware resources 156 are deployed, local subscription manager 158 may maintain current information regarding hardware resources 156 such as the types and quantities of hardware devices of hardware resources 156. Local subscription manager 158 may use the current information to identify compatibility between managed system 150 and various solutions, and enforce solution limitations (e.g., restrict) on managed system 150. When doing so, local subscription manager 158 may provide subscription management service 10 with information about its solution compatibilities thereby allowing subscription management service 10 to only provide for deployment of solutions compatible with managed system 150.

Applications 154 may provide all, or a portion, of the computer implemented services desired by a user, operator, or other person associated with managed system 150. For example, applications 154 may include one or more software stacks corresponding to on one or more solutions.

Applications 154 may utilize hardware resources 156 to provide their respective functionalities. The type and quantity of applications 154 that may be hosted by managed system 150 may depend on hardware resources 156 (e.g., types and quantity of hardware devices). By limiting or expanding access to hardware resources 156, managed system 150 may become compatible with or lose compatibility with various solutions (e.g., which may require certain hardware resources to be present for implementation of the solutions).

Operation manager 152 may mediate presentation of hardware resources 156 to applications 154 by, for example, scheduling use, managing discontinuous access, and/or performing other actions to coordinate use of hardware resources 156 by applications 154 (and/or other entities). Consequently, the operation of applications 154 may be predicated on the operation of operation manager 152 as well as the capabilities of hardware resources 156. Different types of operation managers 152 may facilitate compatibility with different solutions. For example, some solutions may require certain software stacks that may depend on the presence of a particular operation manager.

In an embodiment, one or more of startup manager 151, operation manager 152, and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of startup manager 151, operation manager 152, and applications 154. One or more of startup manager 151, operation manager 152, and applications 154 may be implemented using other types of hardware devices without departing embodiment disclosed herein.

In an embodiment, one or more of startup manager 151, operation manager 152, and applications 154 is implemented using a processor adapted to execute computing code stored on a persistent storage that when executed by the processor performs the functionality of one or more of startup manager 151, operation manager 152, and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of startup manager 151, operation manager 152, applications 154, and/or other entities not shown in FIG. 1C. As part of their respective operation, hardware resources 156 may host firmware and/or may otherwise be programmable to facilitate their respective operation.

In an embodiment, hardware resources 156 include one or more processors. The processors may be used by local subscription manager 158 to execute various code blocks. For example, local subscription manager 158 may include functionality to push code blocks to the processors through an interface. The pushed code blocks may be executed by the processors thereby causing managed system 150 to perform one or more actions. Local subscription manager 158 may do so to, for example, modify operation of managed system 150 to match corresponding subscriptions.

Local subscription manager 158 may provide subscription management services. Subscription management services may include (i) obtaining subscription updates, (ii) removing, adding, or modifying software components (e.g., startup manager 151, operation manager 152, applications 154, etc.) based on the subscription updates, and (iii) enforcing the subscription updates including any limitations specified therein.

By providing its functionality, local subscription manager 158 may manage the configuration, behavior, and/or functionality of managed system 150 in a manner that automatically conforms it to match that expected by subscription management service 10 (e.g., to match those solutions to which managed system 150 is subscribed). As part of the aforementioned process, local subscription manager 158, subscription management service 10, and/or deployment manager 100 may cooperate to enforce subscriptions on managed system 150.

Local subscription manager 158, subscription management service 10, and/or deployment manager 100 may also perform one or more authentications of one another and/or communications from these components to prevent other entities from interfering with the cooperative operation of local subscription manager 158, subscription management service 10, and/or deployment manager 100 for managed system management purposes.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 610, shown in FIG. 6), and may operate independently from other components (e.g., hardware and software) of managed system 150. The management controller may include functionality to manage the operation, configuration, and/or other characteristic of any hardware and/or software components of managed system 150. For example, the management controller may include functionality to load software components on a host managed system, obtain information regarding hardware resources 156, etc.

In an embodiment, the management controller includes a separate communication interface (e.g., from that of a communication interface of managed system 150, referred to as an out of band interface) through which it communicates with subscription management service 10 and/or deployment manager 100. In an embodiment, the management controller uses the same communication interface (e.g., an in band interface) which managed system 150 uses to communicate with other devices. Either of these communication interfaces may facilitate communications with communication system 30, and devices connected to communication system 30 such as subscription management service 10 or deployment manager 100.

Figure 1D:
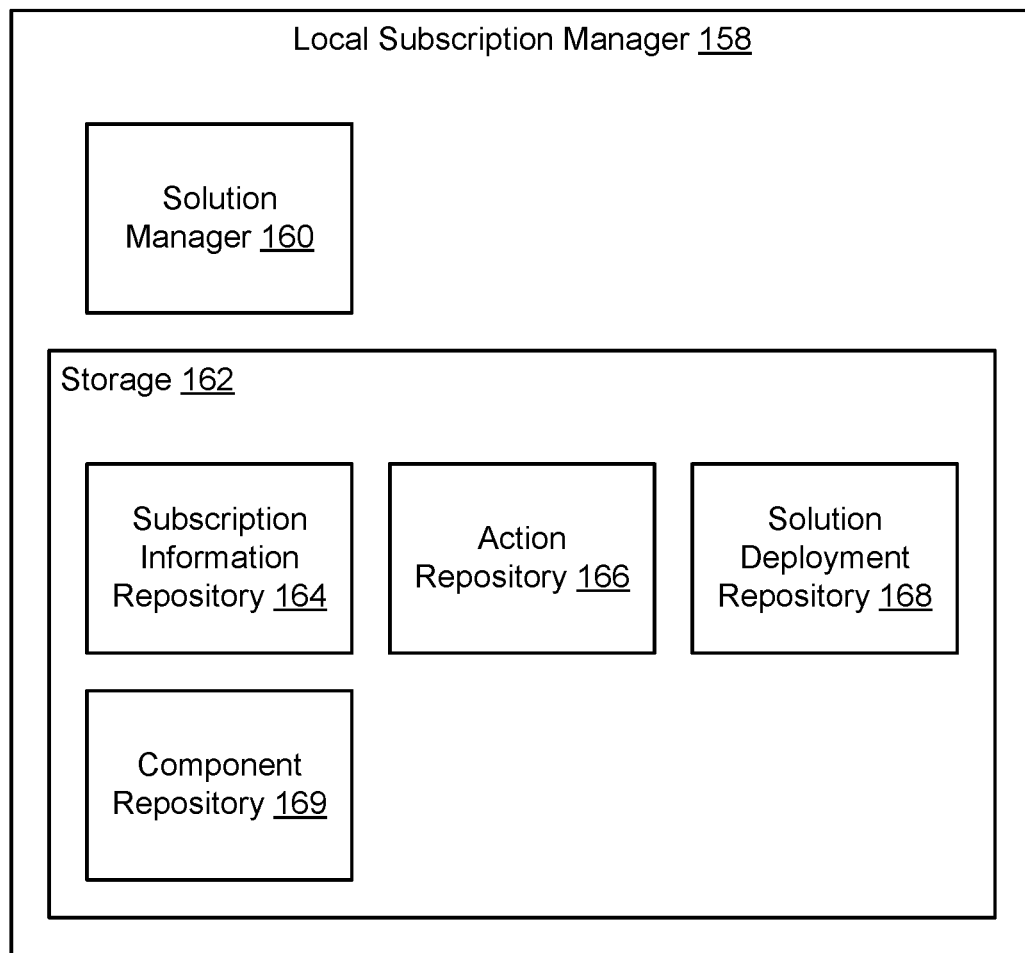
FIG. 1D shows a block diagram illustrating a local subscription manager in accordance with an embodiment.

When providing its functionality, local subscription manager 158 may perform all, or a portion, of the methods and operations illustrated in FIGS. 2-5C. Refer to FIG. 1D for additional details regarding local subscription manager 158.

While illustrated in FIG. 1C with a limited number of specific components, a managed system may include additional, fewer, and/or different components without departing from embodiments disclosed herein.

Turning to FIG. 1D, a block diagram of local subscription manager 158 in accordance with an embodiment is shown. Local subscription manager 158 may be implemented with a computing device similar to that illustrated in FIG. 6 (except for the local subscription manager). In addition (and/or alternatively) to any of the components shown in FIG. 6, local subscription manager 158 may include solution manager 160 and storage 162. Each of these components is discussed below.

Solution manager 160 may include functionality to (i) obtain information regarding solutions to be implemented by a host managed system and/or changes to solutions implemented by the host managed system, (ii) deploy, remove, and/or modify software components to place the host managed system into condition to function as part of the solution, and (iii) record information regarding enforced subscriptions, and limitations thereof, for the host managed system. By doing so, a host managed system may be more likely to provide desired computer implemented services by improving the likelihood that a managed system is configured to provide a desired solution.

In an embodiment, solution manager 160 is implemented using a hardware device including circuitry. The hardware device may be, for example, a digital signal processor, a field programmable gate array, or an application specific integrated circuit. The circuitry may be adapted to cause the hardware device to perform the functionality of solution manager 160. Solution manager 160 may be implemented using other types of hardware devices without departing embodiment disclosed herein.

In one embodiment, solution manager 160 is implemented using a processor adapted to execute computing code stored on a persistent storage that when executed by the processor performs the functionality of solution manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a host managed system that hosts local subscription manager 158.

Storage 162 may store data structures including subscription information repository 164, action repository 166, solution deployment repository 168, and component repository 169.

Subscription information repository 164 may be implemented with one or more data structures that store information regarding subscriptions for a host managed system. The information may include, for example, functionalities to be provided while a subscription is enforced, limitations on the duration of the subscription, and/or information usable to prevent use of a subscribed to function/solution. For example, subscription information repository 164 may include code blocks or other code executable by a host managed system that removes the ability of users of the host managed system to use one or more functionalities of the host managed system. Execution of the code blocks by a host managed system may be initiated by local subscription manager 158 when a corresponding subscription expires (or meets another type of limitation indicating that a code block should be executed).

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by solution manager 160 when a condition is met, such as a subscription limit being exceeded or a new subscription being obtained.

In an embodiment, action repository 166 includes at least one set of actions keyed to changes in subscription of a management entity for the host managed system. The actions may include (i) restarting/initializing a host managed system, (ii) after doing so, interrupting a normal startup process performed by the host managed system prior to the host managed system booting to a management entity, (iii) while the normal startup process is interrupted, dynamically configuring a management entity, and/or (iv) resuming the normal startup process such that the host managed systems hands off, after startup, operation of the managed system to the dynamically configured management entity. In this manner, the management entity utilized by a host managed system may be dynamically changed over time to meet the needs of users of the host managed system. The aforementioned process may also include exporting data (that may not be compatible with a changed solution) and importing the exported data in a format that is compatible with the changed solution.

As new subscriptions or changes to subscriptions are obtained and implemented, solution manager 160 may update subscription information repository 164 and/or action repository 166 based on the subscriptions. Thus, the subscriptions may be locally recorded. Likewise, solution manager 160 may remotely record implementation of the subscriptions with a subscription management service. Consequently, both subscription management service and local subscription manager may operate in accordance with the same information, thereby providing for a subscription based management model of solutions.

Solution deployment repository 168 may be implemented with one or more data structures that store information regarding how various types of solutions may be implemented with a host managed system. The information may include, for example, a list of software components to be hosted by a managed system to provide the solution, a list of actions and/or an order of the actions to cause the software components to be deployed, location information for various software components, and/or other information usable to implement a solution. While illustrated in FIG. 1D as being stored in the local subscription manager 158, solution deployment repository 168 may be hosted by other entities (e.g., deployment manager 100) which may obtain and provide relevant information from the repository for various solutions to be implemented by a host managed system.

Component repository 169 may be implemented with one or more data structures that store copies of or information usable to obtain copies of various software components and/or configuration settings for software and/or hardware components of a host managed system. Solution deployment repository 168 may include references to various portions of component repository 169 to allow for various software components and/or configuration settings to be obtained. While illustrated in FIG. 1D as being stored in the local subscription manager 158, component repository 169 may be hosted by other entities (e.g., deployment manager 100).

While various data structures have been illustrated and described in FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to local subscription manager 158 (e.g., in a storage of a deployment manager or subscription management service) in a manner that is still accessible to local subscription manager 158.

While illustrated in FIG. 1D with a limited number of specific components, a local subscription manager may include additional, fewer, and/or different components without departing from embodiments disclosed herein.

Figure 1E:
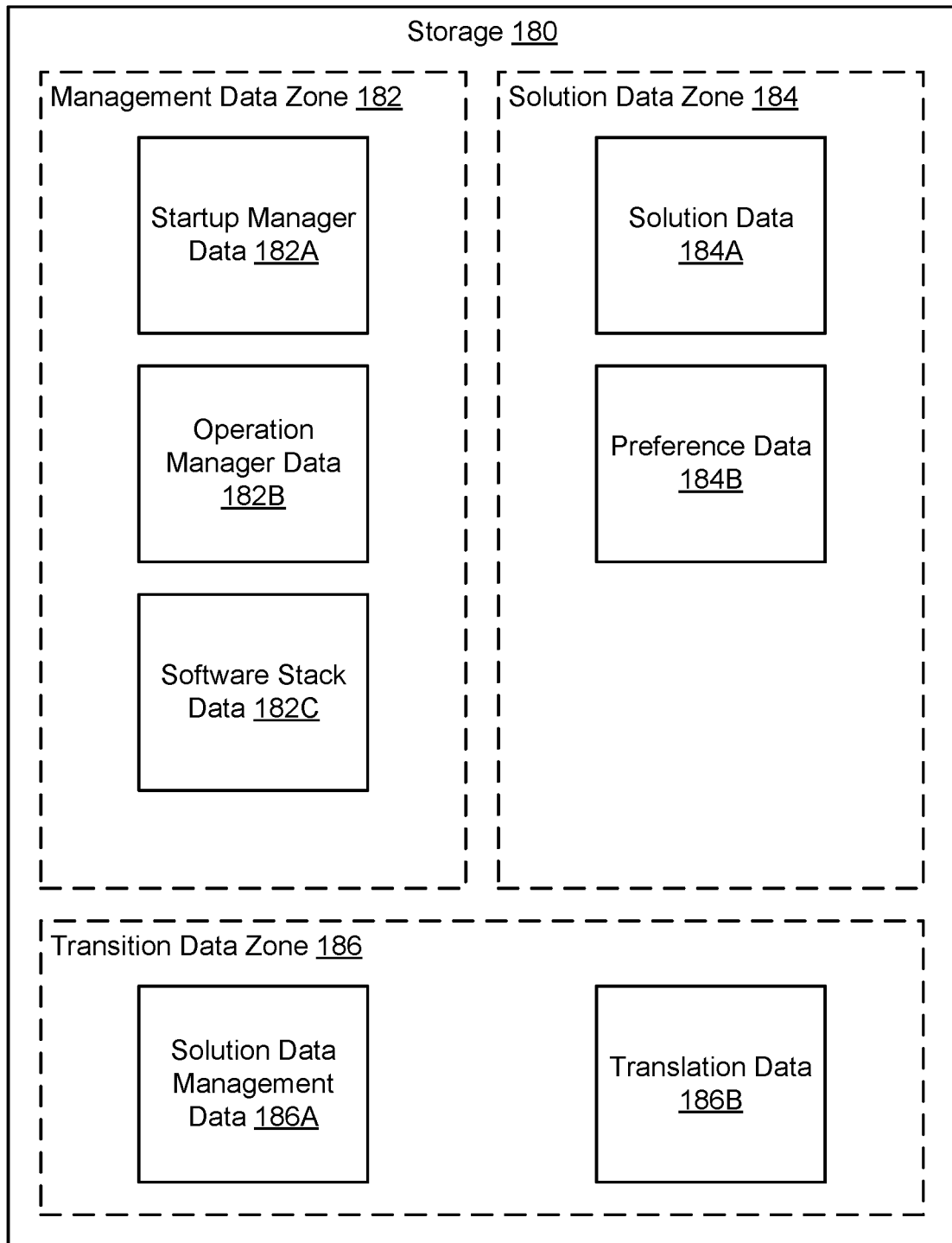
FIG. 1E shows a block diagram illustrating a storage in accordance with an embodiment.

To facilitate implementation of new subscriptions, changes to subscriptions, and disablement of subscriptions, managed system may store data in a manner that facilitates modification of the managed systems while retaining solution data. Turning to FIG. 1E, a diagram of storage 180 in accordance with an embodiment is shown. Storage 180 may be a portion of storage resources of a managed system. Any number of managed systems may implement a storage similar to storage 180.

In an embodiment, storage 180 is implemented using physical devices that provide data storage services (e.g., storing data and providing copies of previously stored data). The devices that provide data storage services may include hardware devices and/or logical devices. For example, storage 180 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 180 may include a memory device (e.g., a dual in line memory device) in which data is stored and from which copies of previously stored data are provided. In another example, storage 180 may include a persistent storage device (e.g., a solid-state disk drive) in which data is stored and from which copies of previously stored data is provided. In a still further example, storage 180 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 180 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 180 may logically divide all, or a portion, of its storage resources into various zones 182, 184, 186. The respective zones 182, 184, 186 may store different types of data for different purposes. The arrangement of the respective zones may allow for efficient reconfiguration of managed systems, as discussed below.

Storage 180 may include management data zone 182. Management data zone 182 may include data structures used by management entities hosted by a managed system. For example, management data zone 182 may include startup manager data 182A, operation manager data 182B, and/or software stack data 182C. Each of these data structures may include, for example, computer code (e.g., executable instructions) corresponding to a hosted entity, configuration settings, and/or other information usable to facilitate operation of management entities and/or software stacks in a manner consistent with a solution implemented by the managed system.

Storage 180 may also include solution data zone 184. In contrast to management data zone 182, solution data zone 184 may include data structures that are relevant to a solution being provided with the managed system. For example, solution data zone 184 may include user data generated with the solution provided to a user. Loss of the user data may impact the utility of the solution to a user, but may not prevent function of the management entities and/or software stack (e.g., which may be impacted by loss of data from management data zone 182).

In an embodiment, solution data zone 184 includes solution data 184A and preference data 184B. These data structures may include user data and preferences of the user with respect to provided solutions.

Storage 180 may also include transition data zone 186. Transition data zone may include data structures usable to facilitate transitions between various solutions provided by a managed system. As discussed above, when a solution subscription is modified, the management entities and/or software stack may be modified (e.g., which may include modifying the data in management data zone 182). Such modifications may create compatibility problems between the data in solution data zone 184 and the modified management entities and/or solution stack, and/or may require some additional information to initiate use of the data in solution data zone 184 by the management entities and/or software stack after modification.

In an embodiment, transition data zone 186 include solution data management data 186A and translation data 186B. Solution data management data 186A may include information regarding entities that generated the data in solution data zone 184, access information for the data in solution data zone 184, information regarding the utility of the data in solution data zone 184 with respect to a provided solution, and/or other types of information which may be used to facilitate future use of the data in solution data zone 184 after changes in subscriptions. Likewise, translation data 186B may include information usable to translate various data structures to other types of data structures. Consequently, the information included in translation data 186B may be used, for example, to modify a structure of solution data 184A after a subscription change is implemented to ensure compatibility of solution data 184A with the changed solution (e.g., such that various applications of a software stack may be able to utilize the data).

The data zones (e.g., 182, 184, 186) may correspond to, for example, partitioned storage regions. Consequently, when a new solution is to be implemented, the management data zone 182 may be wiped and re-imaged with various software images to provide a different solution.

In some embodiments, various portions of data stored in solution data zone 184 may be moved, exported, modified, and/or imported as part of implementing a subscription change. For example, various portions of solution data 184A may be exported to a data storage system where it may be translated into a form compatible with the changed solution. The translated data may then be imported to a host managed system after the management entities and/or software stack are modified to comply with the change in subscription.

While various data structures have been illustrated and described in FIG. 1E with specific structures, any of the data structures may be implemented with different structures (e.g., lists, tables, linked lists, databases, etc.), stored in different locations, and/or spanned across any number of devices without departing from embodiments disclosed herein.

While illustrated in FIG. 1E with a limited number of specific components, a storage may include additional, fewer, and/or different components without departing from embodiments disclosed herein.

As discussed above, the components of FIG. 1A may perform various methods to provide computer implemented services using managed systems that may provide respective solutions. FIGS. 2-5C illustrate examples of methods that may be performed by the components of FIG. 1A.

Figure 2:
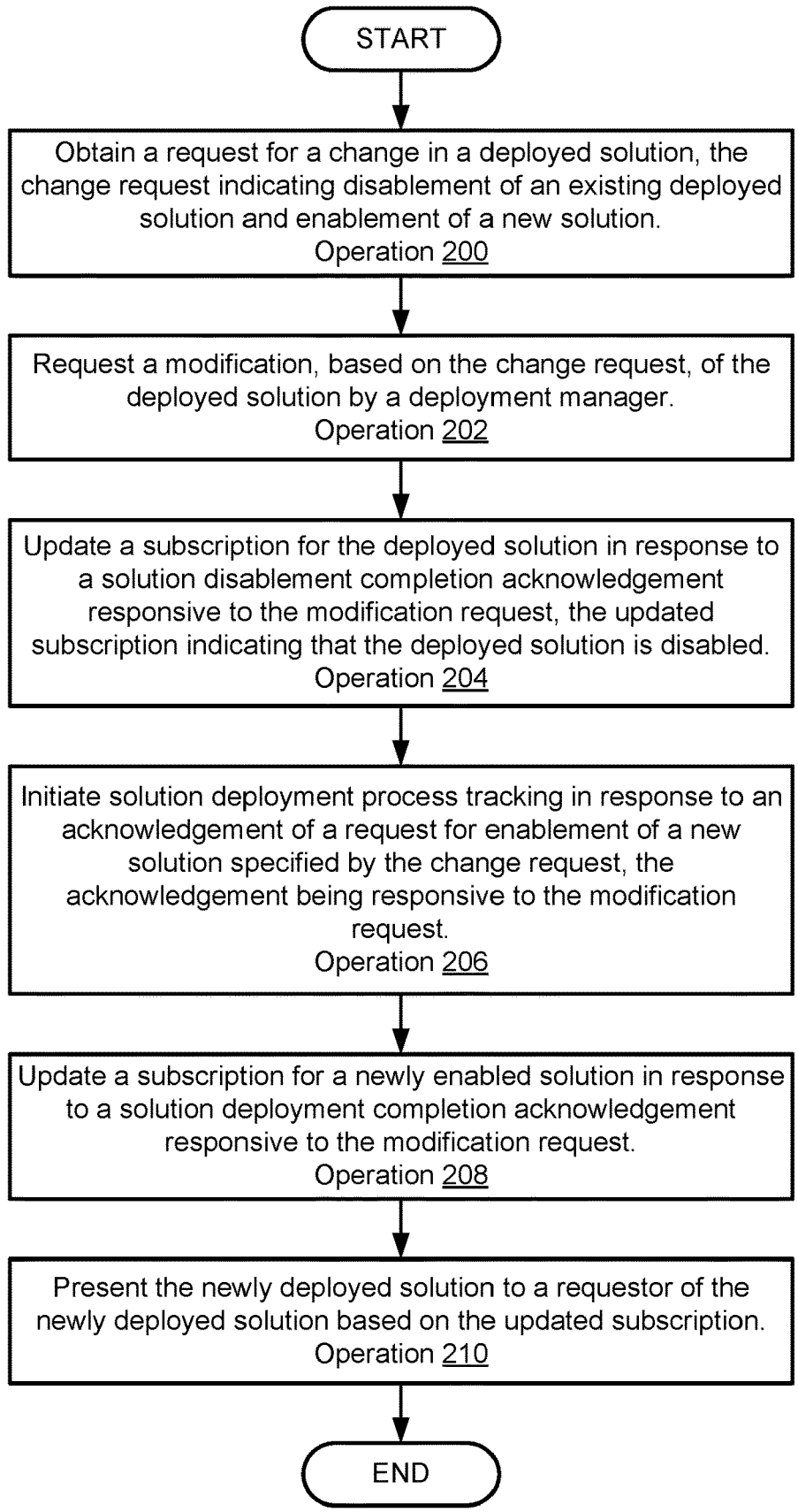
FIG. 2 shows a flow diagram illustrating a method of servicing solution requests in accordance with an embodiment.

Turning to FIG. 2, a flow diagram illustrating a method of servicing a solution change request in accordance with an embodiment is shown. The method illustrated in FIG. 2 may be performed by a subscription management service when a request for a changed in a solution is received.

At operation 200, a request for a change in a deployed solution is received. The change request may be received by presenting one or more solutions for a deployment, or components thereof, to a user via a graphical user interface (e.g., presented to the user on a user device operably connected to the subscription management service). The user may select the solution and may also specify any limitations for a subscription to the solution such as, for example, a duration of the subscription. The solution request may be obtained via other methods without departing from embodiments disclosed herein.

In an embodiment, the solution change request includes an identifier of a solution and one or more limitations (e.g., duration, number of performed services, processes, etc.) on a subscription to the solution. The solution may be any type of solution that may be provided with one or more corresponding computer implemented services.

At operation 202, modification of the deployed solution by a deployment manager is requested. The deployment manager may manage one or more managed systems. The modification of the deployed solution may be requested by sending a message (e.g., a solution modification request) to the deployment manager indicating the modification for the deployed solution.

At operation 204, a subscription for the deployed solution is updated in response to a solution disablement completion acknowledgement. The solution disablement completion acknowledgement may be response to the modification request and indicate that the deployed solution is no longer being provided. The subscription may be updated by modifying a subscription repository maintained by the subscription management service to indicate that the deployed solution is no longer subscribed to (e.g., by the requestor in operation 200) nor available for use.

At operation 206, a solution deployment tracking processing is initiated in response to an acknowledgement of a request for enablement of a new solution specified by the change request. The acknowledgement may be sent by the deployment manager to the subscription management service when one or more of the managed devices managed by the deployment manager begin a process of deploying the changed solution to provide the solution specified in the change request. The solution deployment may be tracked by adding information to the subscription repository (e.g., maintained by the subscription management service) indicating that the solution is being prepared but is not yet subscribed to by the user (e.g., while the user is not able to utilize the solution by virtue of the managed systems performing the configuration process), an organization, etc.

At operation 208, a subscription for the newly enabled solution is updated in response to a solution deployment completion acknowledgement from the deployment manager. The solution deployment completion acknowledgement may be sent in a message to the subscription management service once the managed systems have been configured to provide the solution specified by the modification request. The subscription for the solution may be updated by modifying the subscription repository to indicate that the subscription is live as well as indicating any limitations with respect to the subscription for the solution (e.g., as specified by a user in operation 200). The solution deployment completion acknowledgement may be responsive to the modification request.

At operation 210, the newly deployed solution is presented to a requestor of the solution based on the updated subscription. For example, the subscription management system may send a message or otherwise indicate to the requestor (e.g., the user that sent the solution request in operation 200) that the changed solution is available for use. Access information for the changed solution may also be presented to the requestor.

The method may end following operation 208.

While various communications using messages have been described with respect to the operations of FIG. 2, other methods for managing a distributed system may be implemented without departing from embodiments disclosed herein. For example, public-subscribe systems, master-slave systems, and/or other types of distributed system management may be employed rather than and/or in conjunction with message passing or other command and control schemes.

Figure 3A:
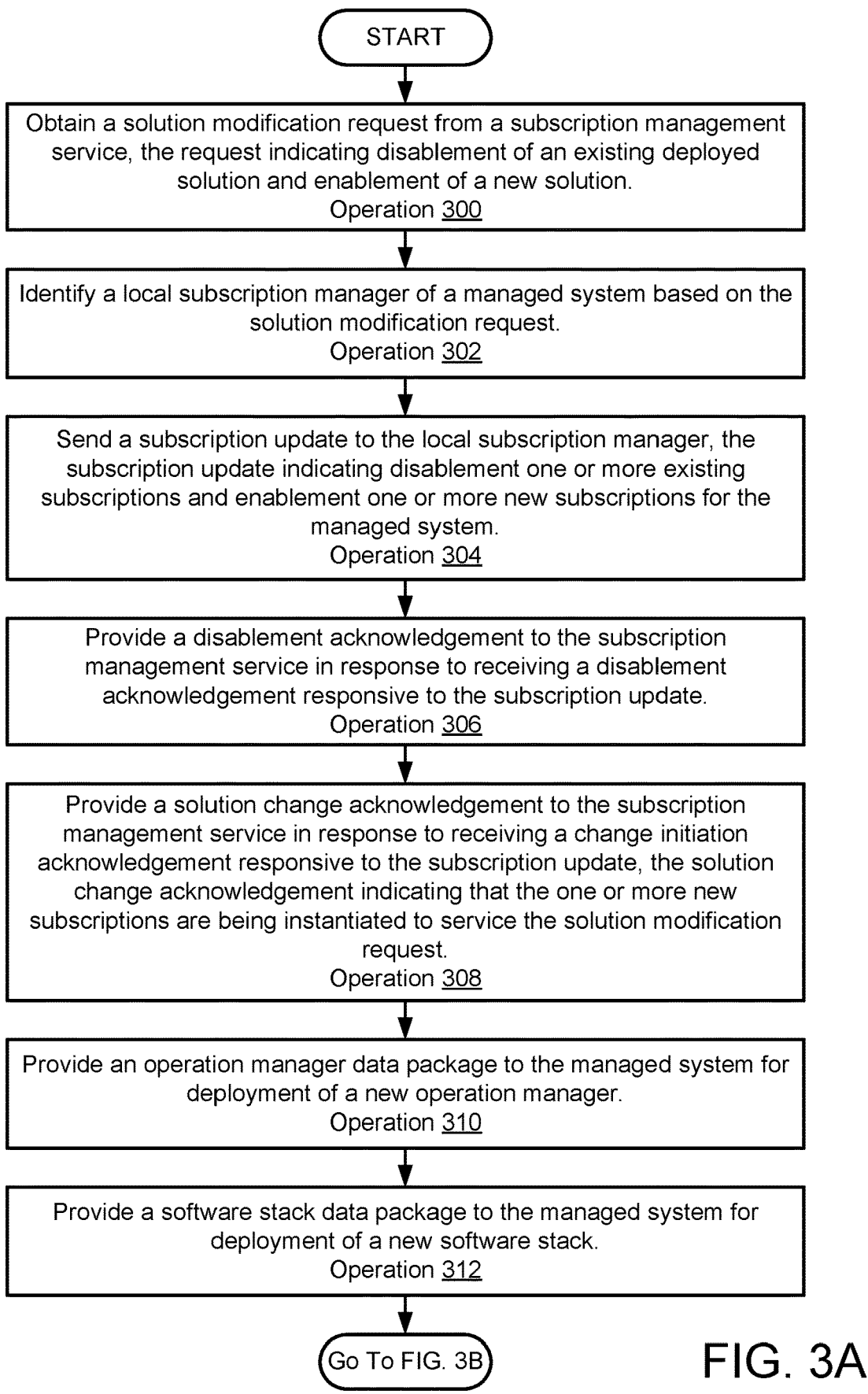
FIGS. 3A-3B show a flow diagram illustrating a method of servicing solution deployment requests in accordance with an embodiment.
Figure 3B:
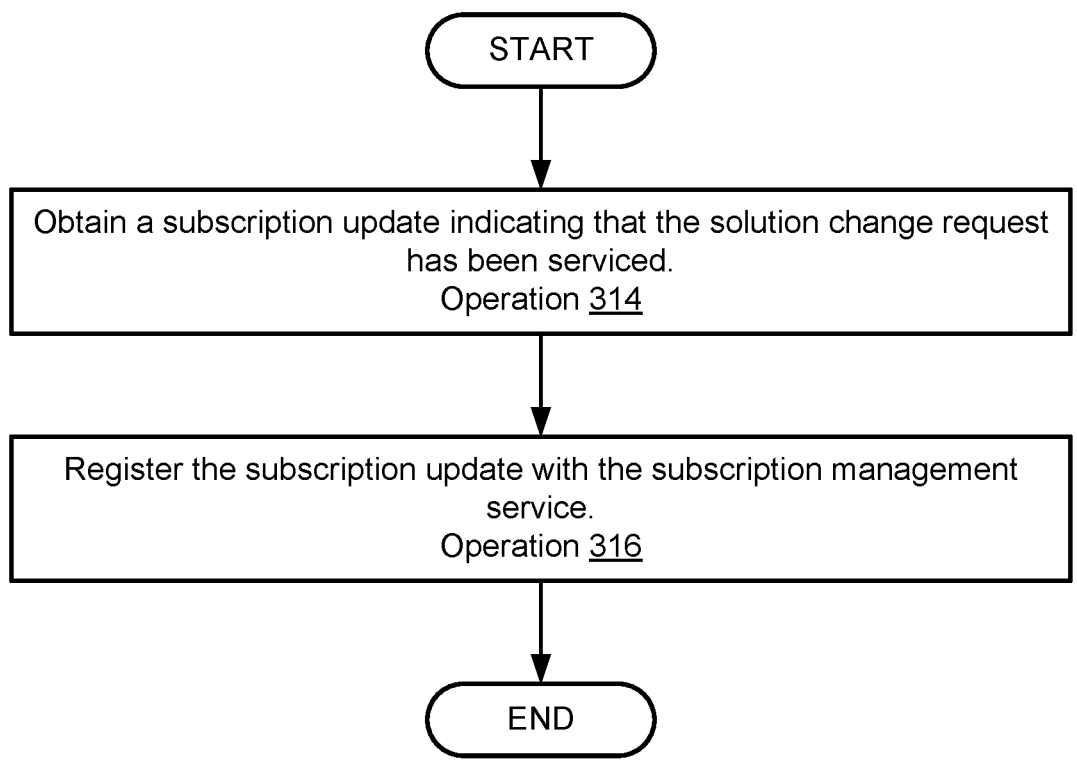

Turning to FIGS. 3A-3B, flow diagrams illustrating a method of servicing a solution modification request in accordance with an embodiment is shown. The method illustrated in FIG. 3 may be performed by a deployment manager that manages any number of managed systems and is managed by a subscription management service.

At operation 300, a solution modification request is obtained from a subscription management service. The solution modification request may indicate that an existing deployed solution is to be disabled (e.g., no longer provided and is no longer subscribed to) and a new solution is to be provided using managed systems that are managed by the deployment manager. The solution modification request may also specify limitations on a subscription to the solution. The solution modification request may be obtained in a message from the subscription management service, and/or via other methods.

At operation 302, a local subscription manager of a managed system is identified based on the solution modification request. The managed system may include hardware resources sufficient to provide all, or a portion, of computer implemented services for the solution and may, at least in part, provide the existing deployed solution. The local subscription manager may be identified via a table or other type of look up data structure maintained by the deployment manager. The data structure may include information regarding the hardware resources of managed systems, access information for local subscription managers hosted by the managed systems, solutions being provided with the managed systems, and/or other types of information usable to ascertain which managed systems may be utilized to satisfy the solution modification request without overloading (or otherwise impairing the operation of) the managed systems.

At operation 304, a subscription update is sent to the local subscription manager of the managed system. The subscription update may indicate disablement one or more existing subscriptions and enablement one or more new subscriptions for the managed system.

The subscription update may include any number of enablement actions usable to deploy software components and/or perform (re)configurations on the host managed system, specify any number of limitations (e.g., duration) for the subscription, and/or any number of disablement actions usable to prevent the enabled functionality associated with the subscription from being provided. For example, the disablement actions may include removing software, depowering various hardware resources, and/or other types of actions to limit the function of a managed system.

The subscription update may also, for example, include identifiers or other information indicating which subscriptions are to be disabled as part of the disablement of the one or more existing subscriptions. The aforementioned information may allow the local subscription manager of the managed system to identify one or more code blocks for performance of the disablement. The code blocks may have been obtained by the local subscription managed as part of deployment of the existing deployed solution.

At operation 306, a disablement acknowledgement is provided to the subscription management service in response to receiving a disablement acknowledgement responsive to the subscription update. The disablement acknowledgement may be provided by sending it to the subscription management service in a message and/or via other methods. The disablement acknowledgement responsive to the subscription update may be generated by the local subscription manager when the local subscription manager completes, initiates, or otherwise participates in disablement of the existing deployed solution. The disablement acknowledgement responsive to the subscription update may be received via a message.

At operation 308, a solution change acknowledgement is provided to the subscription management service in response to receiving a change initiation acknowledgement responsive to the subscription update. The solution change acknowledgement may indicate that the one or more new subscriptions are being instantiated to service the solution modification request. The solution change acknowledgement may be provided by sending it to the subscription management service in a message and/or via other methods. The change initiation acknowledgement responsive to the subscription update may be generated by the local subscription manager when the local subscription manager completes, initiates, or otherwise participates in deployment of the new solutions. The change initiation acknowledgement responsive to the subscription update may be received via a message.

At operation 310, an operation manager data package is provided to the managed system for deployment of a new operation manager. The operation manager data package may be provided in response to a request from the local subscription manager hosted by the managed system. The local subscription manager may make the request when implementing or otherwise servicing the subscription update.

At operation 312, a software stack data package is provided to the managed system for deployment of a new software stack. The software stack data package may be provided in response to a request from the local subscription manager hosted by the managed system. The local subscription manager may make the request when implementing or otherwise servicing the subscription update.

Turning to FIG. 3B, at operation 314, a subscription update indicating that the solution change request has been serviced is obtained. The subscription update may be obtained from the local subscription manager hosted by the managed system. The local subscription manager may send the subscription update after completing service of the subscription update.

At operation 316, the subscription update is registered with the subscription management service. The subscription update may be registered by sending a message to the subscription management service. The message may indicate that the solution specified by the solution change request is deployed and available for use by a user that requested that the solution be changed.

The method may end following operation 316.

The method illustrated in FIG. 3 may be repeated any number of times to facilitate configuration of any number of managed systems to provide a changed solution for a user. For example, operations 302-316 may be repeated until a number of managed systems with sufficient resources and capabilities are configured to cooperatively provide a changed solution (e.g., one or more computer implemented solutions that provide a functionality).

While not illustrated in FIGS. 3A-3B, the deployment manager may also coordinate or otherwise facilitate export, archiving, and/or otherwise managing solution data during servicing of the solution change request. For example, copies of solution data may be exported to the deployment manager (or storage locations specified by the deployment manager), the copies may be modified for compatibility reasons, and the modified copies may be imported to or otherwise instantiated on the managed systems after the management entities and/or software stack are modified for compliance with the subscription update.

Figure 4A:
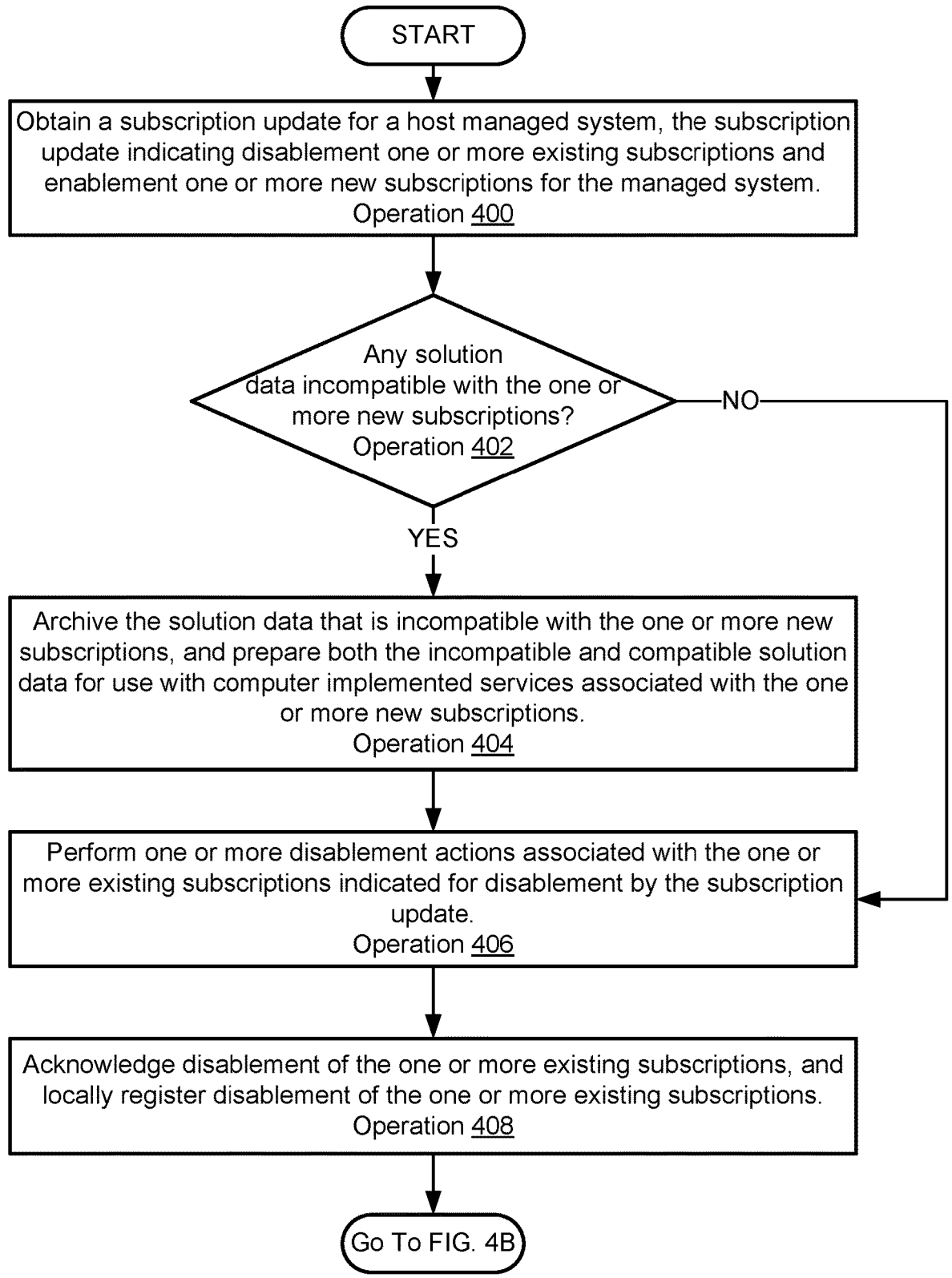
FIGS. 4A-4C show a flow diagram illustrating a method of servicing subscription updates in accordance with an embodiment.
Figure 4B:
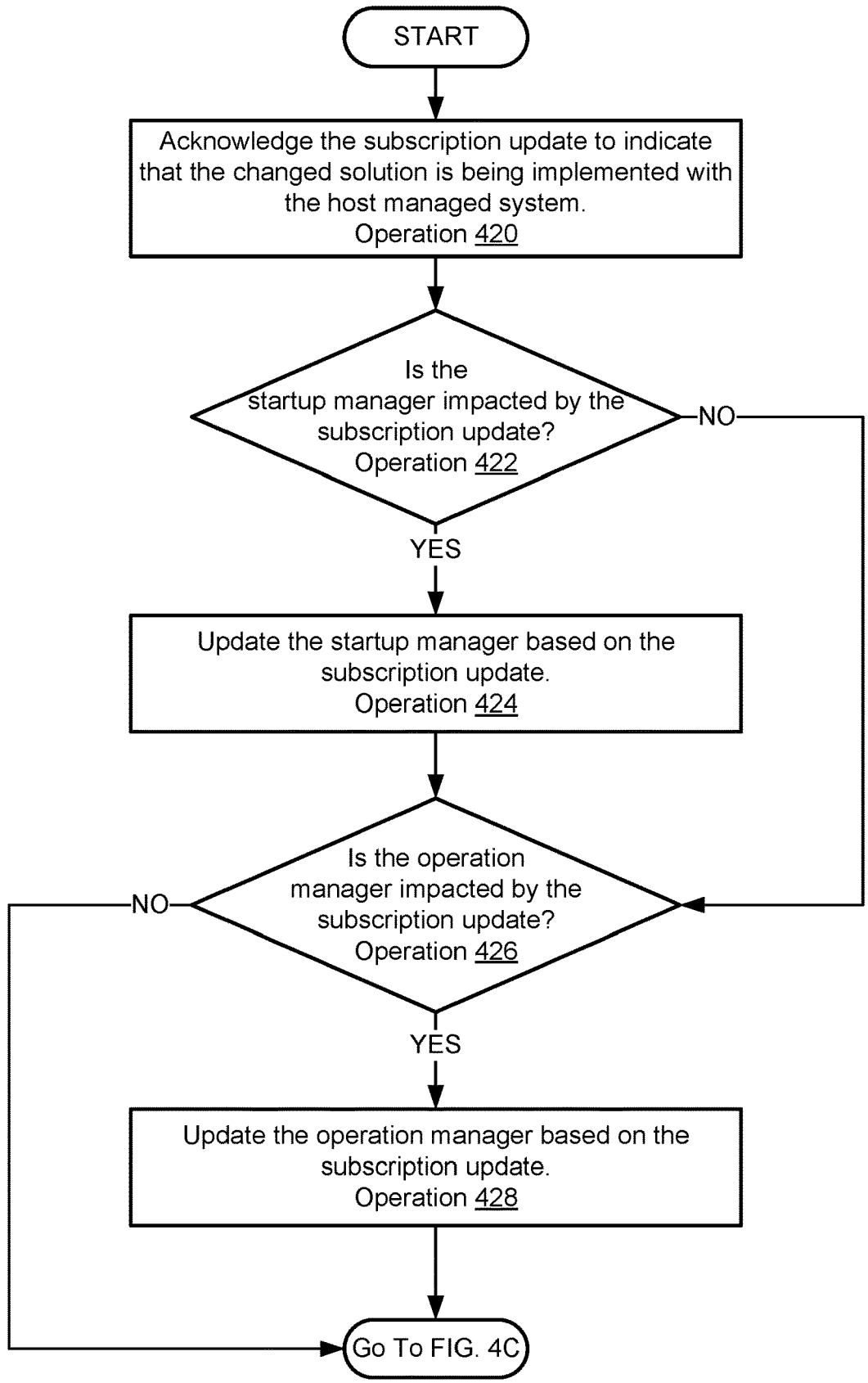
Figure 4C:
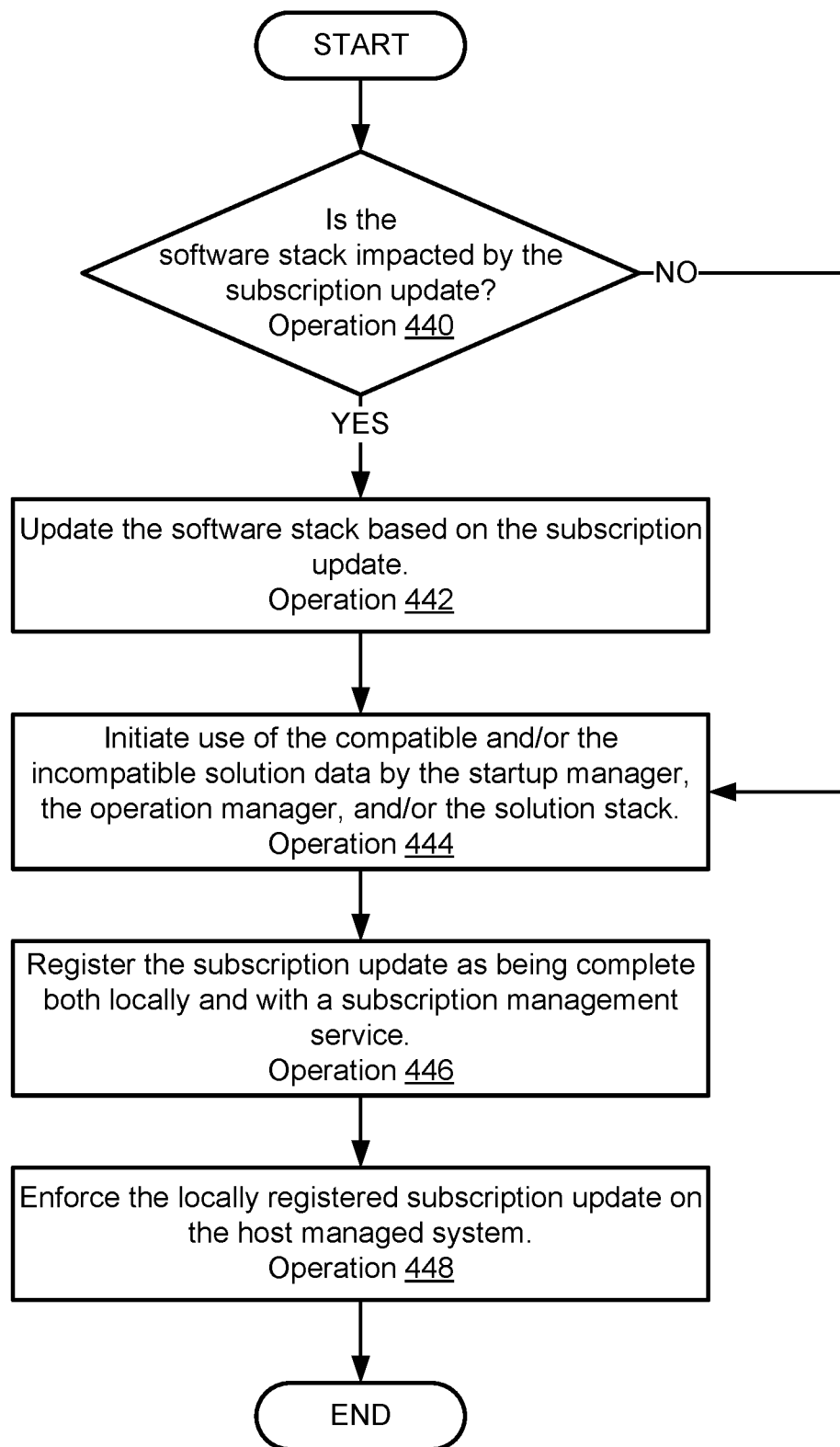

Turning to FIGS. 4A-4C, flow diagrams illustrating a method of servicing a subscription update in accordance with an embodiment is shown. The method illustrated in FIG. 4A may be performed by a local subscription manager hosted by a host managed system.

At operation 400, a subscription update is obtained. The subscription update may be obtained from a deployment manager (e.g., via a message) that manages the host managed system. The subscription update may indicate disablement one or more existing subscriptions and enablement one or more new subscriptions for the managed system. The subscription update may impact (e.g., via the disablement and enablement) a startup manager, operation manager, and/or a solution stack of a host managed system. For example, the subscription update may specify enablement actions that cause any of these entities to be modified, replaced, removed, etc. and may reference existing subscriptions that are ending which may specify disablement actions that may cause any of these entities to be modified, replaced, removed, etc.

At operation 402, a determination is made regarding whether any solution data is incompatible with the one or more new subscriptions. The solution data may be hosted by the host managed system for the local subscription manager. The solution may be determined based on the various portions of the solution data and the management entities and solution stack that will be hosted by the host managed system once the subscription update is implemented. For example, the types of entities that generated or otherwise used the portions of the solution data may be compared to the entities that will utilize the portions of the solution data once the one or more new subscriptions are implemented. The comparison may be performed with a lookup data structure that utilizes a type of the portions of solution data as a key and provides a list of entities that are compatible with the type of the portions of solution data. The listed entities may be compared to those that will use the portions of solution data after the one or more new subscriptions are implemented to make the determination.

For example, consider a scenario where a managed systems hosts V1 of an application that stores a database as part of the solution data. A new solution may indicate that V2 of the application will utilize the database when a subscription update is completed. The name of the application may be used to perform a lookup in a data structure (e.g., table, list, etc.). The lookup may return, for example, a list including V1, V1.12, and V1.5 of the application but may not include V2 of the application. In such a scenario, then it may be determined that the database is incompatible with the one or more new subscriptions. However, had the new solution indicated that V1.5 of the application will utilize the database, then the determination may be that no solution data is incompatible with the one or more new subscriptions.

If it is determined that any solution data is incompatible with the one or more new subscriptions, then the method may proceed to operation 404. Otherwise, the method may proceed to operation 406.

At operation 404, the solution data that is incompatible with the one or more new subscriptions is archived. The solution data that is incompatible may be archived by, for example, storing a copy of it in a data storage system, storage of the local subscription manager, and/or other locations (e.g., such as protected partition in the host managed system). Multiple copies may be stored in various locations without departing from embodiments disclosed herein. Performing the storage may allow for the solution data that is incompatible with the one or more subscriptions to be removed from the solution data zone of the host managed system without risking data loss.

Additionally, in an embodiment, both the incompatible solution data and the compatible solution data is prepared for use with the computer implemented services associated with the one or more new subscriptions. For example, various data structures may be stored in a transition data zone to facilitate use of the solution data after the management entities and/or solution stacks hosted by the host managed system are modified to service the subscription update.

At operation 406, one or more disablement actions associated with the one or more existing subscriptions that are indicated for disablement by the subscription update are performed. For example, the one or more existing subscriptions may include or otherwise indicate the disablement actions, which may be implemented with corresponding code blocks. The disablement actions may be performed by, at least in part, pushing the code blocks to the host managed system for execution. Execution of the code blocks may cause the startup manager, operation manager, and/or solution stack of the host managed system to be modified. Hardware components of the host managed system may also be disabled and/or enabled via execution of the code blocks.

Performing the one or more disablement actions may place the host managed system in an operating state in which it is unable to provide (all or a portion of) the previously deployed solution.

At operation 408, the disablement of the one or more existing subscriptions is acknowledged. The disablement may be acknowledged by sending a message indicating as such to a deployment manager and/or subscription management service.

Additionally, in an embodiment, disablement of the one or more existing subscriptions may be locally registered. The disablement may be registered by purging the subscription registrations for the one or more existing subscriptions, or by otherwise modifying data hosted by the local subscription manager indicating the existing subscriptions to indicate the disablement.

Turning to FIG. 4B, at operation 420, the subscription update is acknowledged to indicate that a changed solution is being implemented by the host managed system. The subscription update may be acknowledged by sending a message indicating as such to the deployment manager. The deployment manage may report the acknowledgement to a subscription management service that manages the deployment manager and managed systems.

At operation 422, a determination is made regarding whether the startup manager is impacted by the subscription update. The determination may be made based on the subscription update which may specify or otherwise indicate whether a startup manager is to be reconfigured, modified, removed, and/or replaced, any of which may indicate that the subscription update impacts the startup manager.

If it is determined that the subscription update impacts the startup manager, then the method may proceed to operation 424. Otherwise the method may proceed to operation 426.

At operation 424, the startup manager is updated based on the subscription update. The startup manager may be updated by performing one or more of: (i) modifying a personality module of the startup manager to cause the startup manager to indicate that the host managed system performs a different function than it previously provided, (ii) modifying a configuration of the startup manager (e.g., which may cause additional, fewer, and/or different actions to be performed during startup of the host managed system), and/or (iii) replacing all, or a portion of the startup manager (e.g., by flashing or otherwise modifying data included in a protected storage in which computer instructions corresponding to the startup manager are stored.

To update the startup manager, the local subscription manager may use local information or may obtain information from a deployment manager such as, for example, images of a startup manager to be hosted by the host managed system. The startup manager may be updated by pushing one or more code blocks to the host managed system for execution, which may cause the host managed system to update the startup manager.

At operation 426, a determination is made regarding whether the operation manager is impacted by the subscription update. The determination may be made based on the subscription update which may specify or otherwise indicate whether the operation manager is to be reconfigured, modified, removed, and/or replaced, any of which may indicate that the subscription update impacts the operation manager.

If it is determined that the subscription update impacts the operation manager, then the method may proceed to operation 428. Otherwise the method may proceed to operation 440 illustrated in FIG. 4C.

At operation 428, the operation manager is updated based on the subscription update. The operation manager may be updated by performing one or more of: (i) obtaining an image (e.g., executable code and/or configuration data) corresponding to a new operation manager, (ii) deploying the new operation manager using the image, and/or (iii) configuring the deployed operation manager using the configuration data. In an embodiment, the image is obtained from a deployment manager. The image may be obtained from other locations without departing from embodiments disclosed herein.

Once the new operation manager is deployed (or as part of the deployment), the managed system may be rebooted.

The method may proceed to operation 440 shown in FIG. 4C following operation 428.

Turning to FIG. 4C, a continuation of the diagrams of FIGS. 4A-4B is shown.

At operation 440, a determination is made regarding whether the software stack is impacted by the subscription update. The determination may be made based on the subscription update which may specify or otherwise indicate whether the software stack is to be reconfigured, modified, removed, and/or replaced, any of which may indicate that the subscription update impacts the operation manager.

If it is determined that the subscription update impacts the software stack, then the method may proceed to operation 442. Otherwise the method may proceed to operation 444.

At operation 442, the software stack is updated based on the subscription update. The software stack may be updated by performing one or more of: (i) obtaining an image (e.g., executable code and/or configuration data), binary files, or other data structures corresponding to a new software stack, (ii) deploying the new software stack using the data structures, and/or (iii) configuring the new software stack manager using the configuration data. In an embodiment, the data structures are obtained from a deployment manager. The data structures may be obtained from other locations without departing from embodiments disclosed herein.

Any of operations 424, 428, and 442 may be performed using one or more enablement actions (e.g., code blocks) specified in the subscription update. The enablement actions may be pushed to the host managed system for performance. For example, the enablement actions may be defined with or otherwise utilize code blocks executable by the host managed system. Execution of the code blocks may cause the host managed system to perform the enablement actions.

At operation 444, us of the compatible and/or the incompatible solution data by the startup manager, the operation manager, and/or the solution stack is initiated. Use of the incomputable solution data may be initiated by retrieving it and/or a modified version of it (which may be stored locally or remotely). The startup manager, the operation manager, and/or the solution stack may be directed to utilize the retrieved copy.

In an embodiment, the use is initiated by utilizing importation functionality of the startup manager, the operation manager, and/or the solution stack. For example, any of these entities may be capable of importing data that is incompatible, which may entail converting a structure of the incompatible solution data to a new structure that is compatible. Alternatively, a service or other entity may perform the conversion of the incompatible data.

Use of the compatible solution data may be initiated by, for example, directing the startup manager, the operation manager, and/or the solution stack to use it. For example, access information for the compatible solution data (or portions thereof) may be provided to these entities to initiate use of the compatible solution data.

The aforementioned process may provide for population of the startup manager, the operation manager, and/or the solution stack with the compatible and/or incompatible solution data. Consequently, continuity of a solution may appear to be provided to a user even though the underlying components that provide the solution may have substantially changed due to the solution change request.

At operation 446, the subscription update is registered as being complete both locally and with a subscription management service. The subscription update may be registered locally by modifying a subscription information repository 164. The modification may indicate the subscription as well as limitations and disablement actions (e.g., code blocks) for the subscription. Similar information may be sent to the deployment manager which may provide similar information to the subscription management service which may perform a similar recordation.

At operation 448, the locally registered subscription update is enforced on the host managed system. The locally registered subscription update may be enforced by monitoring operation of the host managed system to identify whether the subscription is exceeded, and performing the disablement actions when the subscription is determined as being exceeded based on the operation monitoring.

The method may end following operation 448.

Figure 5A:
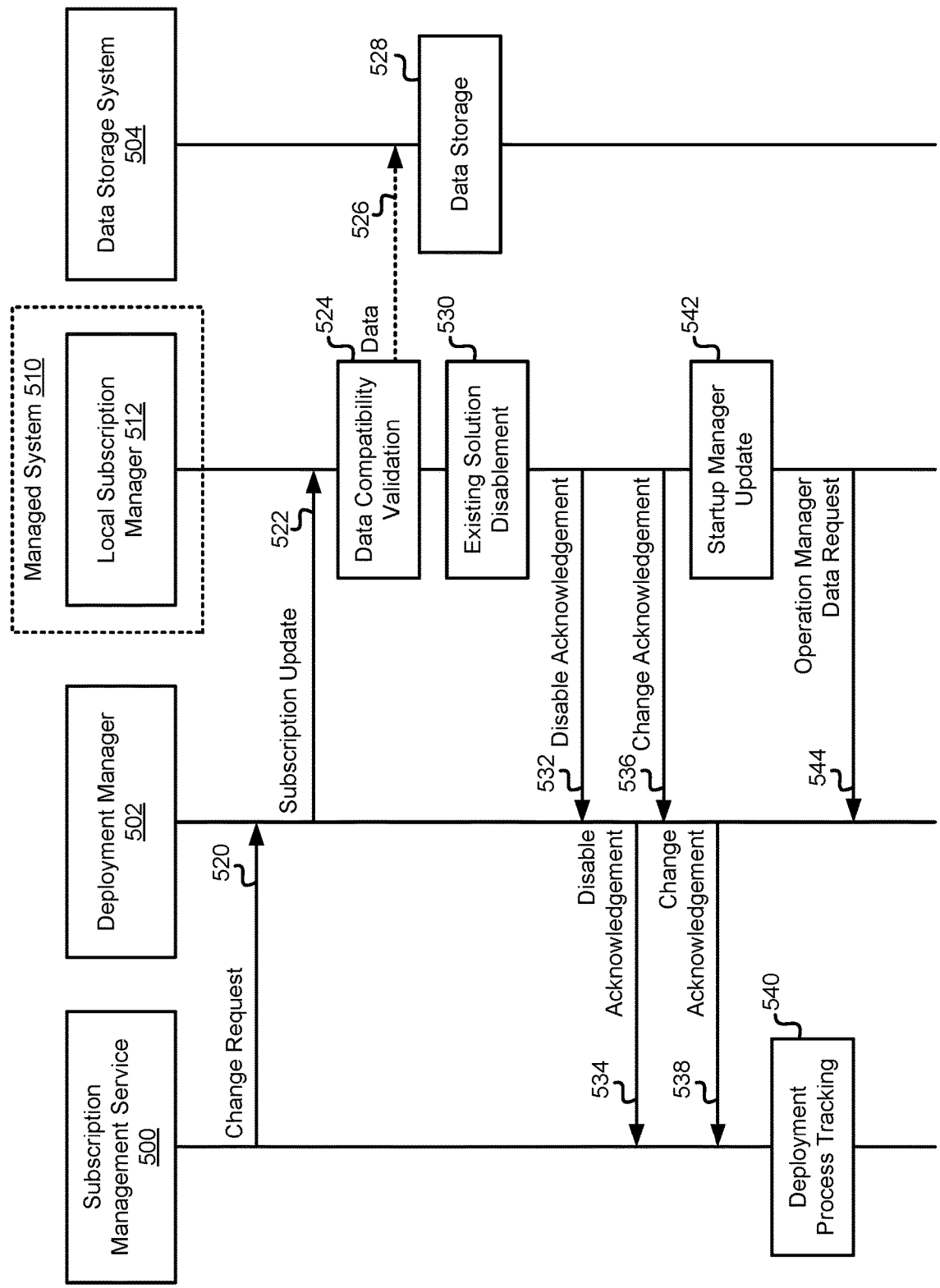
FIGS. 5A-5C show diagrams illustrating interactions between and actions of components of a system in accordance with an embodiment.
Figure 5B:
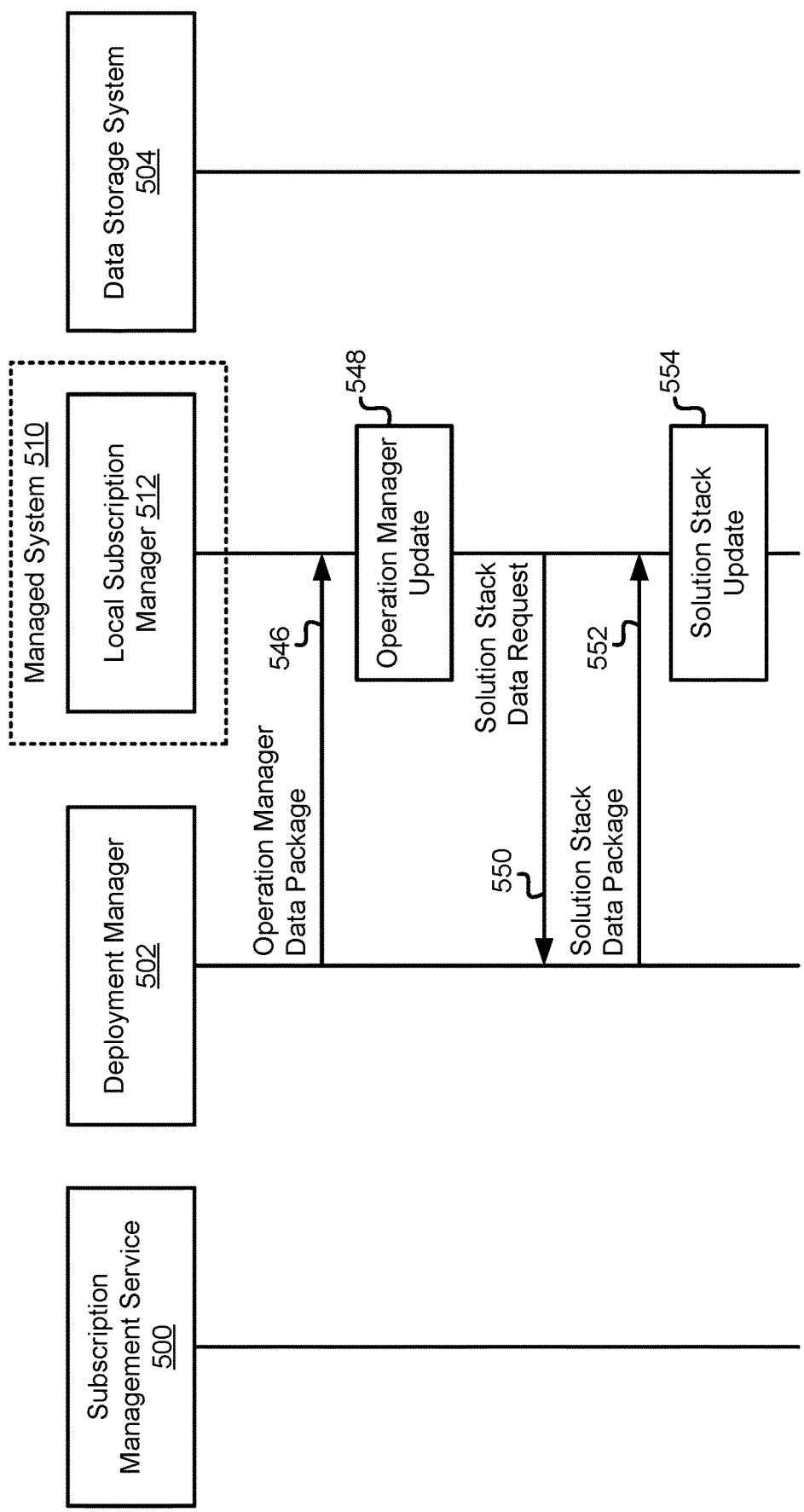
Figure 5C:
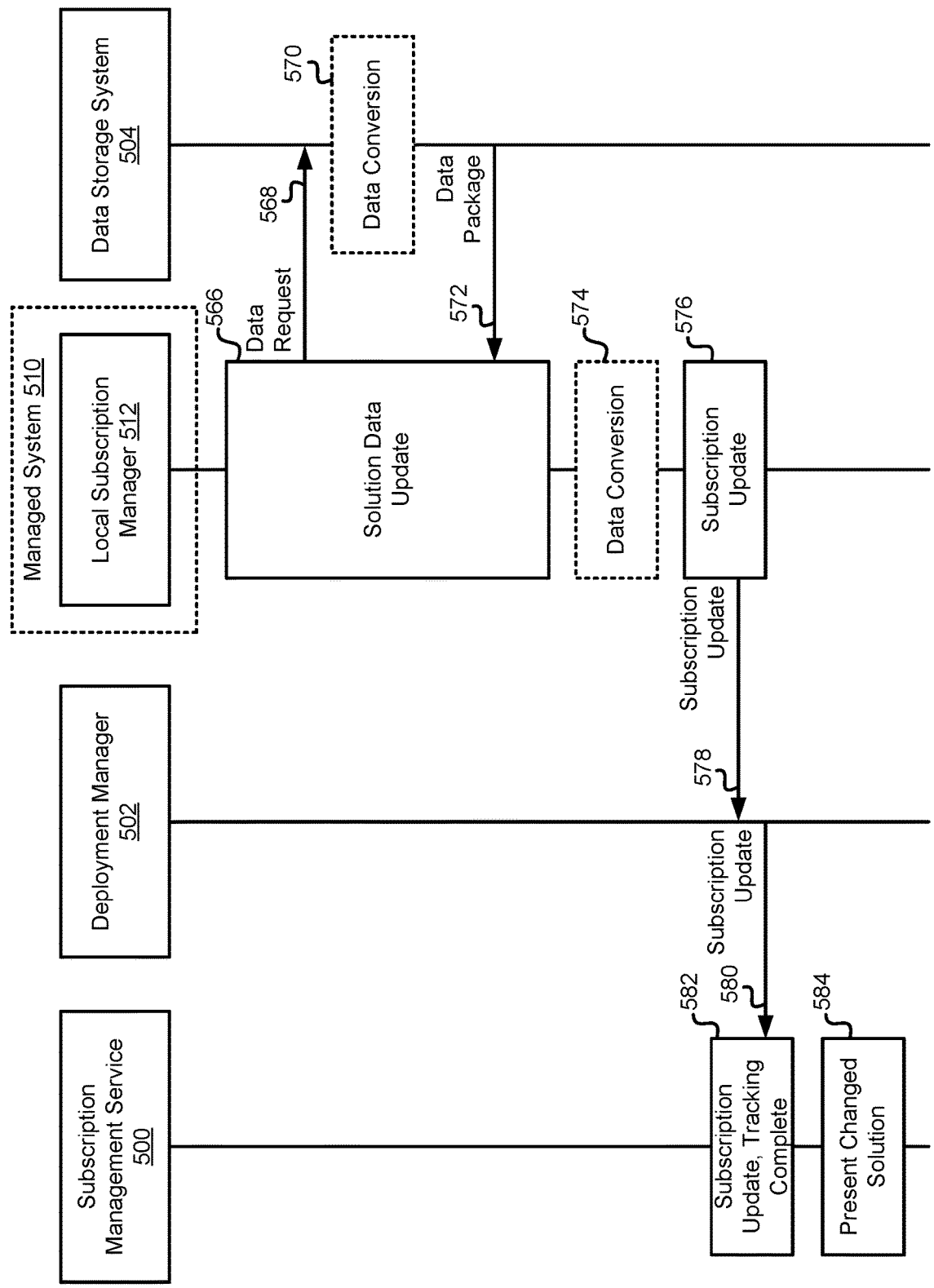

Turning to FIGS. 5A-5C, interaction diagrams in accordance with an embodiment are shown. In these figures, a system similar to that illustrated in FIG. 1A may be operating. In these figures, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

Turning to FIG. 5A, an interaction diagram illustrating a process of providing subscription based solutions in accordance with an embodiment is shown. In FIG. 5A, subscription management service 500 may manage a deployment including deployment manager 502 and managed system 510. These components may utilize data storage system 504 as part of their operation when solution changes are implemented.

At block 520, subscription management service 500 sends a solution change request to deployment manager 502. Based on the request, deployment manager 502, at block 522, may generate and send a subscription update to local subscription manager 512 of managed system 510 to initiate a change in the configuration of managed system 510 to provide the solution specified by the solution change request. The subscription update may indicate changes (modifications, replacement, etc.) to a startup manager, operation manager, and software stack of managed system 510.

At block 524, local subscription manager 512 performs a data compatibility validation for the solution data used by managed system 510 with respect to the changed subscription implemented with the subscription update. Based on the data compatibility validation, at block 526, local subscription manager 512 identifies and sends data that will be incompatible to data storage system 504 for storage. At block 528, data storage system performs data storage for the data.

At block 530, local subscription manager 512 performs an existing solution disablement by pushing one or more code blocks to managed system 510 which are executed and thereby disable the solution provided by managed system 510. At this stage, managed system 510 may be unable to provide the existing solution or the changed solution.

At block 532, local subscription manager 512 sends a disable acknowledgement to deployment manager 502. In response, at block 534, deployment manager 502 sends a disablement acknowledgement to subscription management service 500. Upon receipt of the disablement acknowledgement, subscription management service 500 updates its subscription information to indicate that the existing solution is no longer being provided.

At block 536, local subscription manager 512 begins to implement a new subscription based on the subscription update and sends a change acknowledgement to deployment manager 502 to indicate that managed system 510 is being reconfigured. At block 538, deployment manager 502 sends a change acknowledgement to indicate to subscription management service 500 that the changed solution is in the process of being deployed. In response to the change acknowledgement, subscription management service 500, at block 540, may initiate deployment process tracking for the changed solution.

At block 542, local subscription manager 512 initiates a startup manager update for managed system 510. To do so, local subscription manager may cause managed system 510 to execute one or more code blocks thereby causing enablement actions to be performed. Consequently, the startup manager to which managed system 510 is subscribed may be changed.

At block 544, local subscription manager 512 sends an operation manager data request to deployment manager 502 to request an image of a new operation manager.

Turning to FIG. 5B, at operation 546, deployment manager 502 provides an operation manager data package including the image of the new operation manager. At block 548, local subscription manager 512 initiates an operation manager update for managed system 510. Doing so may deploy the new operation manager to managed system 510 with the obtained image of the new operation manager.

As part of the operation manager update, managed system 510 may be restarted which may cause startup manager to perform a startup process leading up to handoff of managed system 510 to the new operation manager.

At block 550, local subscription manager 512 sends a solution stack data request to deployment manger 502 for a new solution stack. At block 552, deployment manager 502 provides a solution stack data package to managed system 510. The solution stack data package may include data structures usable to install one or more applications on managed system 510.

At block 554, local subscription manager 512 may perform a solution stack update of managed system 510 by installing one or more applications using the solution stack data package.

Turning to FIG. 5C, at block 566, local subscription manager 512 performs a solution data update. The solution data update may place the startup manager, operation manager, and/or software stack in condition to use the solution data used to provide the previously provided solution.

To do so, at block 568, local subscription manager 512 may send a data request to data storage system for the solution data. Because the solution data stored in data storage system 504 may not be compatible with solution, at block 570 and/or block 574, a data conversion of any incompatible portions of the solution data may be performed by local subscription manager 512 and/or data storage system. Consequently, when, at block 572, local subscription manager 512 obtains a data package, the data in the data package may be compatible or may otherwise be placed in a compatible format with the changed solution.

At block 576, local subscription manager 512 performs a subscription update to locally register the subscriptions for the startup manager, operation manager, and solution stack.

At block 578, local subscription manager 512 sends a subscription update to deployment manager 502. In response, at block 580, deployment manager 502 may send the subscription update to subscription management service 500 which may interpret the subscription update as an acknowledgement that the changed solution is implemented and available for use with managed system 510, and/or other managed systems.

At block 582, subscription management service 500 performs a subscription update using the subscription update and treats the changed solution tracking as being complete.

At block 584, subscription management service 500 may present the changed solution to users to allow the changed solution to begin to be utilized through the computer implemented services provided by managed system 510. Because the changed solution is able to utilize the solution data, the users may be provided continuity of solutions. For example, the users may rely on the continued availability of previously generated results, input information, desired configurations for the changed solution, and/or other features.

Thus, via the processes illustrated in FIGS. 5A-5C, embodiments disclosed herein may provide for the automated changes of solutions using managed systems while enabling the solutions to be terminated when subscriptions for the solutions are exceeded.

For example, the registered solutions with the local subscription manager 512 may allow for the independent termination of the changed solution in accordance with subscriptions while also ensuring that only use of the solution by the user while the solution is actually being provided (as opposed to during periods of time when reconfigurations or modifications are being performed to conform operation of managed system to provide desired/subscribed solutions).

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

As discussed above, various components may be implemented with computing devices. For example, any of the components illustrated in FIGS. 1A-5C may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like.

More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for providing a solution using managed systems, the method comprising:
    obtaining, by a local subscription manager hosted by a managed system of the managed systems, a subscription update for the managed system, the subscription update indicating disablement of one or more existing subscriptions and enablement of one or more new subscriptions for the managed system;
    based on the subscription update:
        performing, by the local subscription manager, one or more disablement actions associated with the one or more existing subscriptions; and
        performing, by the local subscription manager, one or more subscription enablement actions based on the one or more new subscriptions, the performance of the one or more subscription enablement actions modifying operation of at least one of:
            a startup manager of the managed system,
            an operation manager of the managed system, and
            a software stack of the managed system;
    locally registering, by the local subscription manager, the one or more existing subscriptions as being disabled and the one or more new subscriptions as being enabled;
    remotely registering, by the local subscription manager, the one or more new subscriptions with a subscription management service that initiated the subscription update; and
    enforcing, by the local subscription manager, the locally registered as enabled one or more new subscriptions on the managed system without enforcing the locally registered as disabled one or more existing subscriptions.

2. The computer-implemented method of claim 1, wherein performing the one or more disablement actions comprises:
    identifying a code block associated with the one or more existing subscriptions, the code block being locally stored in storage resources of the local subscription manager; and
    initiating execution of the identified code block by a processor of computing resources of the managed system, the storage resources of the local subscription manager being distinct from the computing resources and inaccessible by the managed system.

3. The computer-implemented method of claim 2, further comprising:
    after execution of the identified code block, sending a disablement acknowledgement to the subscription management service, the disablement acknowledgement indicating that a previous solution implemented with the managed system is no longer accessible by a user of the managed system.

4. The computer-implemented method of claim 1, wherein performing the one or more subscription enablement actions comprises:
identifying a code block associated with the one or more new subscriptions, the code block being locally stored in storage resources of the local subscription manager; and
initiating execution of the identified code block by a processor of computing resources of the managed system, the storage resources of the local subscription manager being distinct from the computing resources and inaccessible by the managed system.

5. The computer-implemented method of claim 4, further comprising:
prior to initiating execution of the identified code block, notifying the subscription management service that the one or more new subscriptions are being implemented with the managed system.

6. The computer-implemented method of claim 1, wherein locally registering the one or more existing subscriptions as being disabled comprises:
removing one or more entries from a subscription information repository stored in storage resources of the local subscription manager, with presence of the one or more entries in the subscription information repository indicating a live status of the one or more existing subscriptions, and the one or more entries comprise the one or more subscription disablement actions and/or access information for the one or more subscription disablement actions.

7. The computer-implemented method of claim 6, wherein locally registering the one or more new subscriptions as being enabled comprises:
adding one or more new entries to the subscription information repository, each of the one or more new entries being associated with one of the one or more new subscriptions, each of the one or more new entries comprising one or more other disablement actions and/or access information for the one or more other disablement actions, the one or more other disablement actions usable to disable a corresponding one of the one or more new subscriptions.

8. The computer-implemented method of claim 1, wherein the operation of the operation manager is updated:
prior to updating of the operation of the software stack, and
after updating of the operation of the startup manager.

9. The computer-implemented method of claim 8, wherein the managed system is rebooted after the updating of the operation manager and prior to the updating of the software stack.

10. The computer-implemented method of claim 1, wherein the local subscription manager comprises a computing device that is hosted by the managed system, and the computing device operates independently from the managed system.

11. The computer-implemented method of claim 10, wherein the computing device is adapted to obtain the subscription update via an out of band management interface to the subscription management service and/or a deployment manager that manages the managed systems on behalf of the subscription management service.

12. The computer-implemented method of claim 1, wherein enforcing the locally registered as enabled one or more new subscriptions on the managed system without enforcing the locally registered as disabled one or more existing subscriptions comprises:
making a determination that the locally registered as enabled one or more new subscriptions has expired; and
based on the determination:
identifying a code block associated with the locally registered as enabled one or more new subscriptions, the code block being locally stored in storage resources of the local subscription manager; and
initiating execution of the identified code block by a processor of computing resources of the managed system, the storage resources of the local subscription manager being distinct from the computing resources and inaccessible by the managed system.

13. A non-transitory machine-readable medium having instructions stored therein, which when executed by a processor, cause the processor to perform operations for providing a solution using managed systems, the operations comprising:
obtaining, by a local subscription manager hosted by a managed system of the managed systems, a subscription update for the managed system, the subscription update indicating disablement of one or more existing subscriptions and enablement of one or more new subscriptions for the managed system;
based on the subscription update:
performing, by the local subscription manager, one or more disablement actions associated with the one or more existing subscriptions; and
performing, by the local subscription manager, one or more subscription enablement actions based on the one or more new subscriptions, and the performance of the one or more subscription enablement actions modifying operation of at least one of:
a startup manager of the managed system,
an operation manager of the managed system, and
a software stack of the managed system;
locally registering, by the local subscription manager, the one or more existing subscriptions as being disabled and the one or more new subscriptions as being enabled;
remotely registering, by the local subscription manager, the one or more new subscriptions with a subscription management service that initiated the subscription update; and
enforcing, by the local subscription manager, the locally registered as enabled one or more new subscriptions on the managed system without enforcing the locally registered as disabled one or more existing subscriptions.

14. The non-transitory machine-readable medium of claim 13, wherein performing the one or more disablement actions comprises:
identifying a code block associated with the one or more existing subscriptions, the code block being locally stored in storage resources of the local subscription manager; and
initiating execution of the identified code block by a processor of computing resources of the managed system, the storage resources of the local subscription manager being distinct from the computing resources and inaccessible by the managed system.

15. The non-transitory machine-readable medium of claim 14, wherein the operations further comprise:

after execution of the identified code block, sending a disablement acknowledgement to the subscription management service, the disablement acknowledgement indicating that a previous solution implemented with the managed system is no longer accessible by a user of the managed system.

16. The non-transitory machine-readable medium of claim 13, wherein performing the one or more subscription enablement actions comprises:
    identifying a code block associated with the one or more new subscriptions, the code block being locally stored in storage resources of the local subscription manager; and
    initiating execution of the identified code block by a processor of computing resources of the managed system, the storage resources of the local subscription manager being distinct from the computing resources and inaccessible by the managed system.

17. A managed system, comprising:
    a processor;
    a memory; and
    a local subscription manager adapted to perform operations for managing a solution provided by the managed system, the operations comprising:
        obtaining, by a local subscription manager hosted by a managed system of the managed systems, a subscription update for the managed system, the subscription update indicating disablement of one or more existing subscriptions and enablement of one or more new subscriptions for the managed system;
        based on the subscription update:
            performing, by the local subscription manager, one or more disablement actions associated with the one or more existing subscriptions; and
            performing, by the local subscription manager, one or more subscription enablement actions based on the one or more new subscriptions, the performance of the one or more subscription enablement actions modifying operation of at least one of: a startup manager of the managed system, an operation manager of the managed system, and a software stack of the managed system;
            locally registering, by the local subscription manager, the one or more existing subscriptions as being disabled and the one or more new subscriptions as being enabled;
            remotely registering, by the local subscription manager, the one or more new subscriptions with a subscription management service that initiated the subscription update; and
            enforcing, by the local subscription manager, the locally registered as enabled one or more new subscriptions on the managed system without enforcing the locally registered as disabled one or more existing subscriptions.

18. The managed system of claim 17, wherein performing the one or more disablement actions comprises:
    identifying a code block associated with the one or more existing subscriptions, the code block being locally stored in storage resources of the local subscription manager; and
    initiating execution of the identified code block by a processor of computing resources of the managed system, the storage resources of the local subscription manager being distinct from the computing resources and inaccessible by the managed system.

19. The managed system of claim 18, wherein the operations further comprise:
    after execution of the identified code block, sending a disablement acknowledgement to the subscription management service, the disablement acknowledgement indicating that a previous solution implemented with the managed system is no longer accessible by a user of the managed system.

20. The managed system of claim 17, wherein performing the one or more subscription enablement actions comprises:
    identifying a code block associated with the one or more new subscriptions, the code block being locally stored in storage resources of the local subscription manager; and
    initiating execution of the identified code block by a processor of computing resources of the managed system, the storage resources of the local subscription manager being distinct from the computing resources and inaccessible by the managed system.

* * * * *